(12) United States Patent
Okubo

(10) Patent No.: US 6,856,765 B2
(45) Date of Patent: Feb. 15, 2005

(54) CAMERA WITH LIGHT EMISSION FUNCTION, CAMERA PART INSPECTION APPARATUS, CAMERA ADJUSTMENT APPARATUS, AND CAMERA PART UNIT

(75) Inventor: Mitsumasa Okubo, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/308,389

(22) Filed: Dec. 3, 2002

(65) Prior Publication Data

US 2003/0123873 A1 Jul. 3, 2003

(30) Foreign Application Priority Data

Dec. 7, 2001 (JP) .................................... 2001-374672
Jan. 30, 2002 (JP) .................................... 2002-022102

(51) Int. Cl.[7] .................. G03B 17/00; G03B 17/04; G03B 17/18; G03B 5/04; G03B 13/02
(52) U.S. Cl. ................ 396/88; 396/264; 396/286; 396/287; 396/300; 396/349; 396/373
(58) Field of Search ............... 348/207.99, 207.1, 348/207.11, 240.99, 333.02, 333.04, 372, 373; 396/300, 349, 158, 155, 157, 61, 106, 159, 161, 162, 163, 164, 263, 264, 373, 429, 88, 109, 279, 286, 287, 290, 535, 543, 281

(56) References Cited

U.S. PATENT DOCUMENTS

| | | | | | |
|---|---|---|---|---|---|
| 5,202,720 | A | * | 4/1993 | Fujino et al. | 396/158 |
| 5,815,749 | A | * | 9/1998 | Tsukahara et al. | 396/158 |
| 6,029,012 | A | * | 2/2000 | Miyamoto et al. | 396/158 |
| 6,137,959 | A | * | 10/2000 | Matsui | 396/108 |
| 2002/0097323 | A1 | * | 7/2002 | Ito | 348/207 |

FOREIGN PATENT DOCUMENTS

JP          2532739  B2     6/1996

* cited by examiner

Primary Examiner—Judy Nguyen
Assistant Examiner—Rochelle Blackman
(74) Attorney, Agent, or Firm—Frishauf, Holtz, Goodman & Chick, P.C.

(57) ABSTRACT

A CPU judges whether a current operating state of a camera corresponds to an in-service state of a lens barrel or an in-service state of a self-timer, and performs light emission control over a front display LED or a rear display LED by controlling an LED drive circuit. The front display LED or the rear display LED is constituted by integrating LED chips having a plurality of types of colors. Therefore, the front display LED and the rear display LED can emit the light in a plurality of different colors by using one light source.

22 Claims, 17 Drawing Sheets

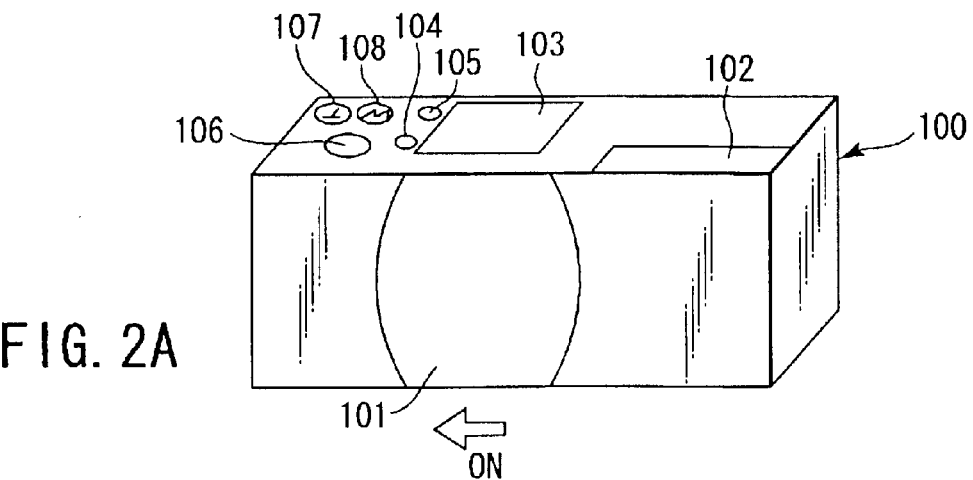
FIG. 2A
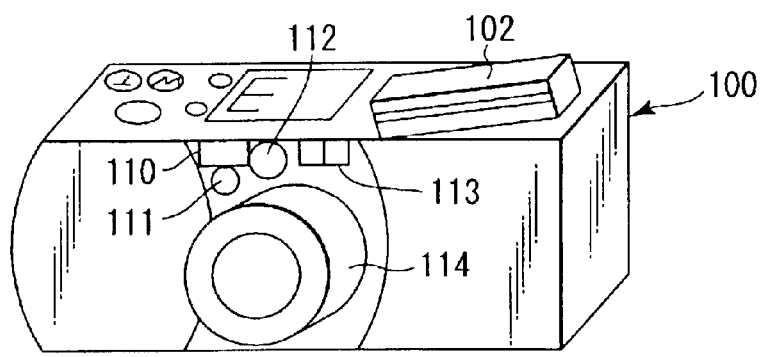
FIG. 2B
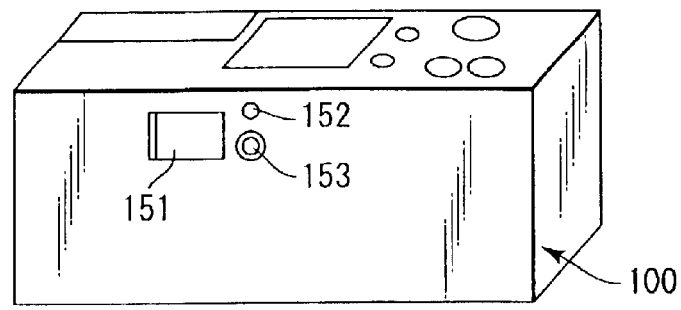
FIG. 2C
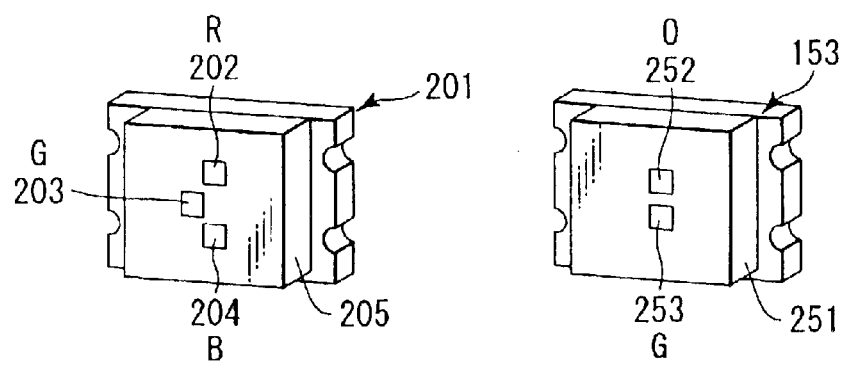
FIG. 3A
FIG. 3B

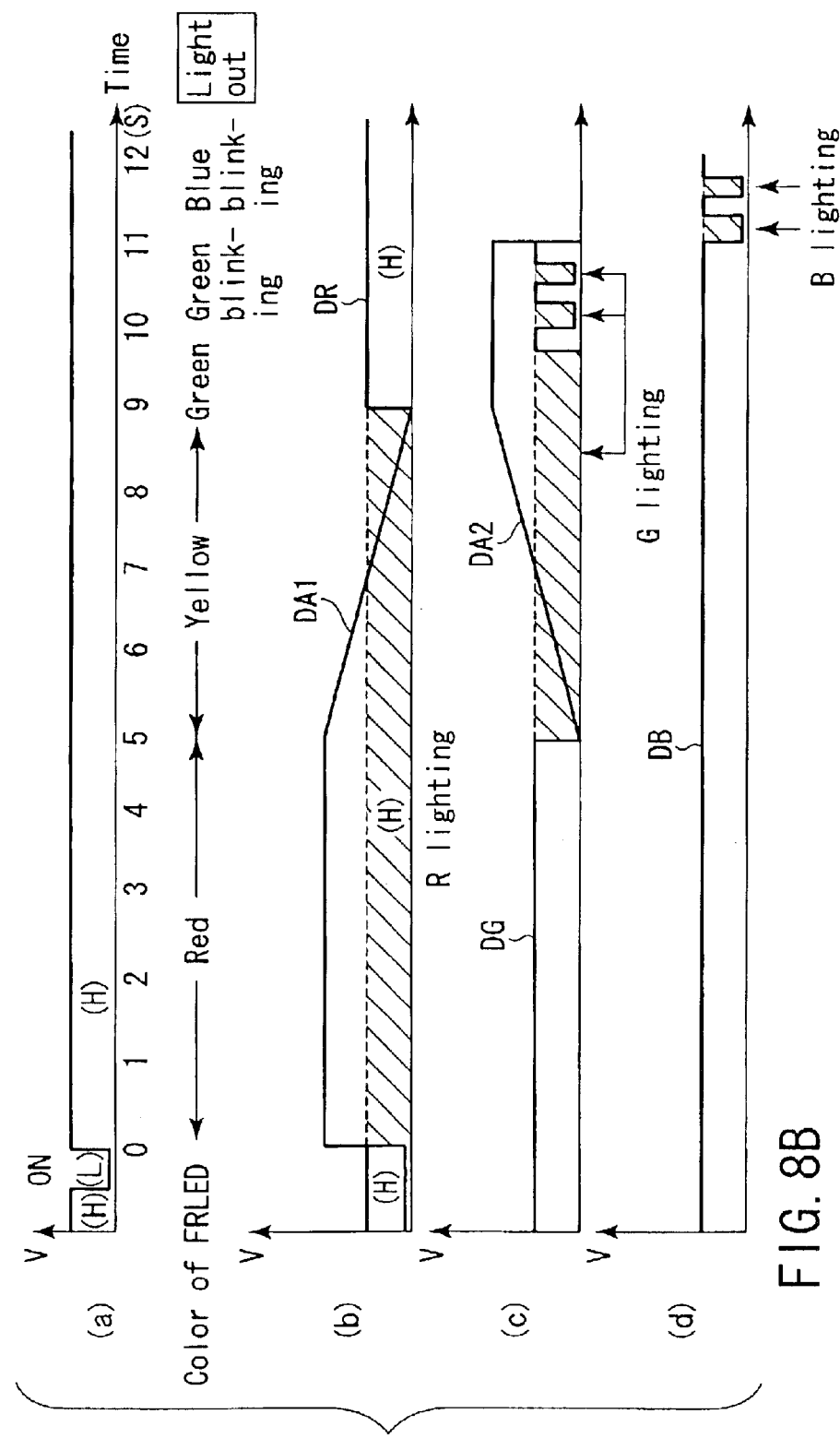

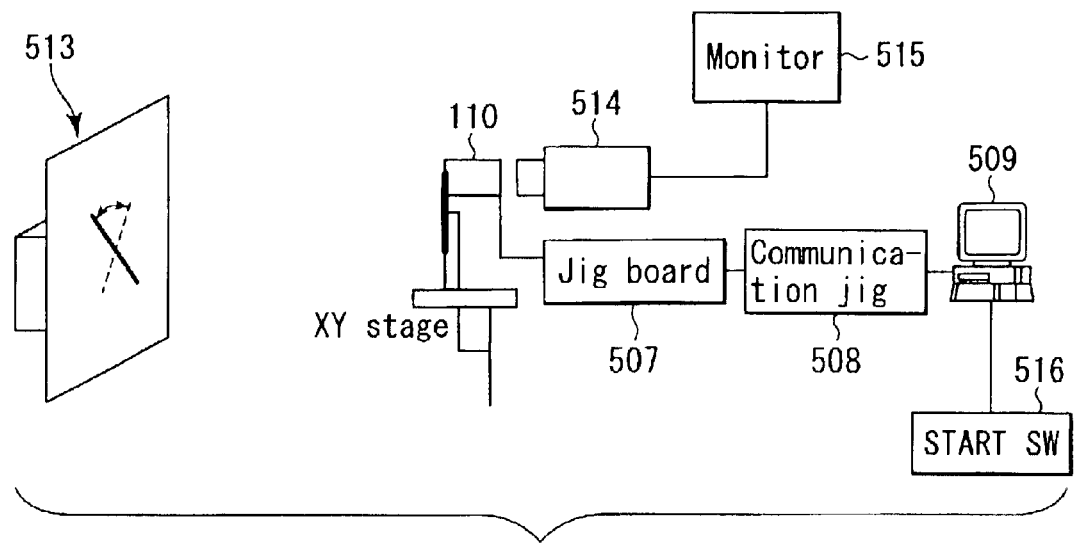
FIG. 12A
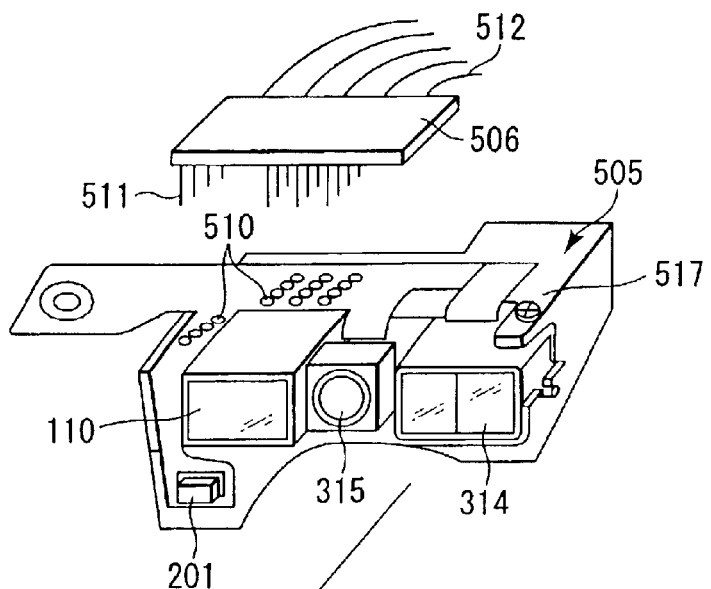
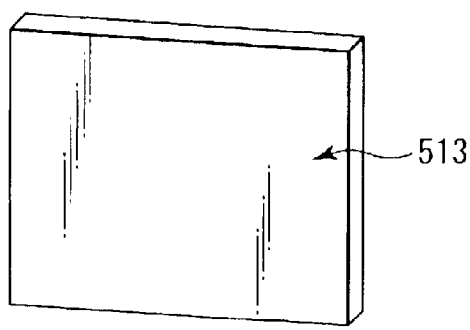
FIG. 12B

CAMERA WITH LIGHT EMISSION FUNCTION, CAMERA PART INSPECTION APPARATUS, CAMERA ADJUSTMENT APPARATUS, AND CAMERA PART UNIT

CROSS-REFERENCE TO RELATED APPLICATIONS

This application is based upon and claims the benefit of priority from the prior Japanese Patent Applications No. 2001-374672, filed Dec. 7, 2001; and No. 2002-022102, filed Jan. 30, 2002, the entire contents of both of which are incorporated herein by reference.

BACKGROUND OF THE INVENTION

1. Field of the Invention

The present invention relates to a camera with a light emission function which has a function to irradiate an object with light other than flash light before emitting flash light, an apparatus for inspecting parts of a camera having such a light emission function, a camera adjustment apparatus, and a camera part unit.

2. Description of the Related Art

There have been conventionally proposed various kinds of cameras which can prevent a phenomenon that eyes of a person are picturized in red, which is a so-called red-eye phenomenon, when taking a picture of the person as an object by using a flash. Further, on the other hand, there have been also proposed various kinds of cameras having a self-timer apparatus which appropriately controls a shutter operation timing.

However, when such a red-eye prevention apparatus, i.e., an apparatus which performs pre-irradiation before emitting flash light on a object in order to avoid red eyes and a display apparatus which displays a clocking operation state of a self-timer are separately configured in a camera, this leads to an increase in size of the camera. Thus, Japanese Patent No. 2532739 proposes a camera in which one LED functions as both the display apparatus which displays a clocking state of the self-timer and the red-eye prevention apparatus which performs pre-irradiation for reducing red eyes by changing light emission patterns of these apparatuses.

However, with the camera disclosed in Japanese Patent No. 2532739, since pre-irradiation for reducing red eyes is performed immediately before release, effects tend to be insufficient in some cases. When a person as an object does not pay attention to a light emitter in irradiation for a short time in particular, the effect of reducing red eyes becomes small. Furthermore, in cases where the person pays attention to the light emitter, the person as an object feels dazzled when pre-irradiation with a large quantity of light is suddenly performed. Therefore, the person has a firm facial expression, and it is hard to obtain a picture with a natural sense.

Moreover, when pre-irradiation for preventing red eyes is started with the same color as that in display of the self-timer besides release, the person as an object may possibly take the light to prevent red eyes for the light for the self-timer by only changing a light emission pattern. That is, a picture may be possibly abruptly taken while the person as an object is not aware of the operation state of the camera.

BRIEF SUMMARY OF THE INVENTION

In view of the above-described problems, it is a feature of the present invention to provide: a camera with a light emission function which can cause an object to pay attention to the camera or a light emission portion for a red-eye reduction function when taking a picture and before flash light emission in particular and thereby improve the red-eye reduction effect, obtain a certain degree of the red-eye reduction effect without selecting a strong red-eye reduction function, enable a portrait with a further natural facial expression by easing a feeling of discomfort with respect to stimulation to eyes when the strong red-eye reduction function is selected, and avoid confusion of light emission as the red-eye reduction function and light emission in clocking of a self-timer, notify not only a camera operator but also an object of an operation state of the camera, e.g., end of a shooting preparation operation after power ON; a camera part inspection apparatus utilizing a technique of a camera with such a light emission function; a camera adjustment apparatus; and a camera part unit.

According to a first aspect of the present invention, there is provided a camera comprising:

a light emission portion which can emit light in a direction of an object and change a light emission wavelength distribution in light emission; and a control portion which changes the light emission wavelength distribution of the light emission portion in accordance with a state of the camera, and causes the light emission portion to emit light.

According to a second aspect of the present invention, there is provided a camera comprising:

a light emission portion which can emit light in a direction of an object;

a main switch which switches a stop state and an operating state of the camera; and a control portion which actuates the light emission portion when the camera performs a shooting preparation operation in accordance with an operation of the main switch.

According to a third aspect of the present invention, there is provided a camera comprising:

a flash device which illuminates an object in synchronization with a shutter when shooting;

a light emission portion which is different from the flash device and can emit light in a direction of an object; and a control portion which causes the flash device to pre-irradiate the object before light emission of the flash device in synchronization with the shutter which operates in accordance with a release operation, and causes the light emission portion to emit light in synchronization with an operation different from the release operation before the pre-irradiation.

According to a fourth aspect of the present invention, there is provided a camera part inspection apparatus comprising:

a connector can be electrically connected to an electric board having mounted thereon a light emission portion which can perform light emission display outside a camera and an electric part required for the operation of the camera; and an inspection control portion which controls the light emission portion so as to display an inspection result by causing the light emission portion to emit light when performing inspection of the electric part.

According to a fifth aspect of the present invention, there is provided a camera adjustment apparatus comprising:

an adjustment portion which adjusts a camera attached thereto; and a light emission control portion which can perform light emission control over a light emission portion which is provide to a camera and causes the light emission portion to emit light in accordance with adjustment states of the adjustment portion.

According to a sixth aspect of the present invention, there is provided a camera adjustment apparatus comprising:

an optical axis adjustment portion which can perform adjustment by moving any of a distance measuring portion and a finder of a camera in such a manner that an optical axis of the photometric portion and an optical axis of the finder have a predetermined relationship when adjusting a unit in which the distance measuring portion and the finder are united as one and which has a light emission portion;

a detection portion which detects a displacement of the optical axes; and a light emission control portion which performs light emission control over the light emission portion in accordance with a direction of the displacement which is detected by the detection portion.

According to a seventh aspect of the present invention, there is provided a camera part unit comprising:

a light emission portion which can perform light emission display toward the outside of a camera;

an electric part which is required for the operation of the camera and inspected by an inspection apparatus; and an electric board which has the light emission portion and the electric part mounted thereon and has a connect portion connected to the inspection apparatus, wherein the inspection apparatus has a control portion which can perform light emission control over the light emission portion, and the light emission portion is controlled by the control portion so as to display an inspection result of the electric part by the inspection apparatus.

As described above, according to the present invention, when taking a picture and before flash light emission in particular, an object can be caused to pay attention to the camera or the light emission portion for the red-eye reduction function, thereby improving the red-eye reduction effect.

In addition, it is possible to take a portrait picture with a further natural facial expression by obtaining a certain degree of the red-eye reduction effect without selecting the strong red-eye reduction function and easing a feeling of discomfort with respect to stimulation to eyes when the strong red-eye reduction function is selected.

Additionally, it is possible to avoid confusion of light emission as the red-eye reduction function and light emission for clocking of the self-timer.

Further, an object can be notified of end of the shooting preparation operation at the time of power ON.

Furthermore, it is possible to inform the state in adjustment or inspection of the camera without preparing a special display portion.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is an external appearance front view of the camera according to the embodiment of the present invention, in which a lens barrier is closed;

FIG. 2B is an external appearance front view of the camera according to the embodiment of the present invention, in which the lens barrier is opened;

FIG. 2C is an external appearance rear view of the camera according to the embodiment of the present invention;

FIG. 3A is a structural view of a front display LED;

FIG. 3B is a structural view of a rear display LED;

FIG. 8A is a view for illustrating a display showing a self-timer mode;

FIG. 8B a timing chart for illustrating drive control of the front display LED (FRLED) in self-timer clocking;

FIG. 12A is a view for illustrating an outline of an adjustment apparatus for the AF sensor mounted on the AF flexible printed circuit;

FIG. 12B is a view for illustrating a concrete structure of the adjustment apparatus for the AF sensor mounted on the AF flexible printed circuit;

FIG. 17 is a timing chart for illustrating an embodiment of changing a light emission color of the FRLED with a time after a first release switch is turned on.

DETAILED DESCRIPTION OF THE INVENTION

Figure 1:
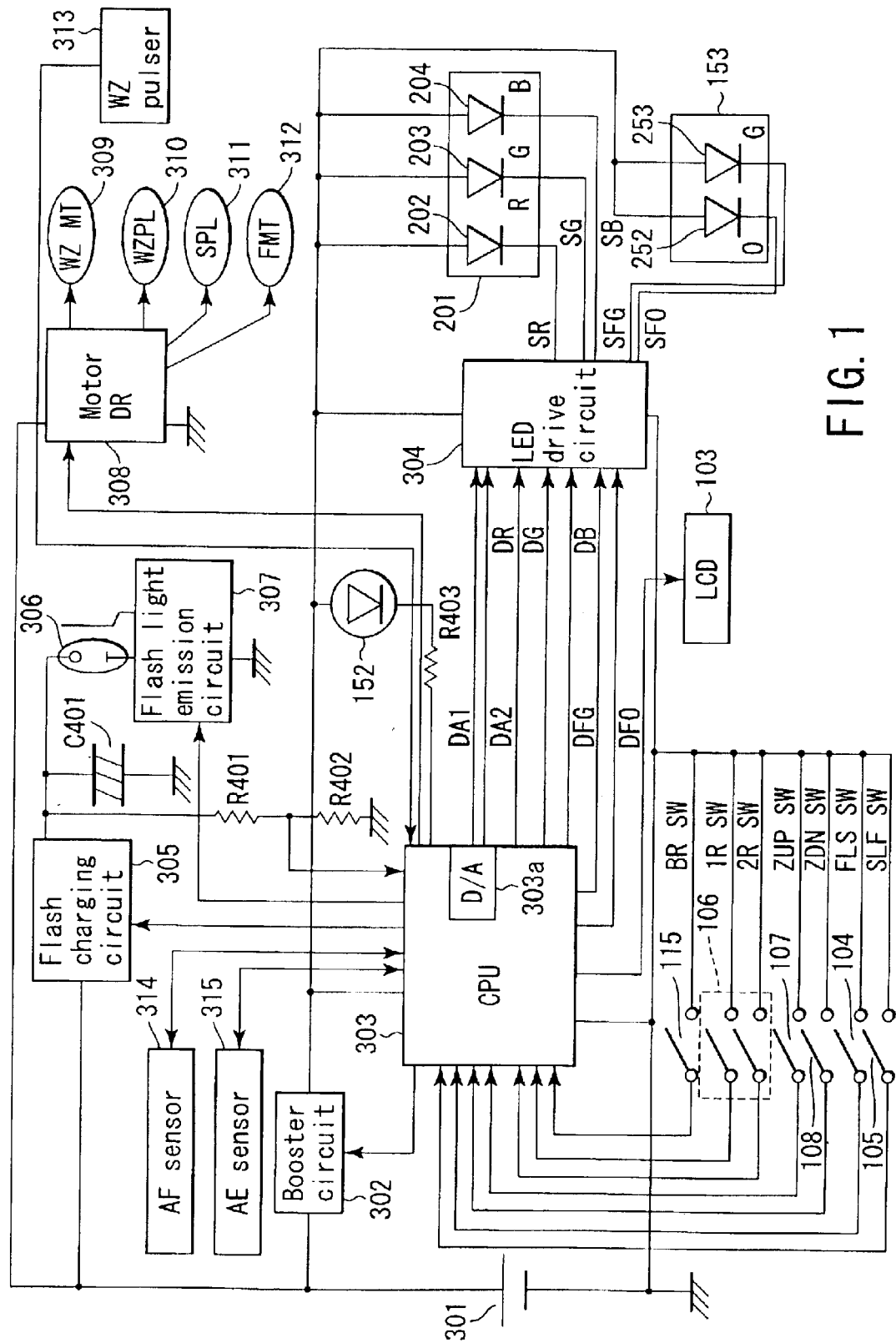
FIG. 1 is a block diagram showing an electrical structure of a camera according to an embodiment of the present invention.

Embodiments according to the present invention will now be described hereinafter with reference to the accompanying drawings.

FIG. 2A is an external appearance view of a camera with a light emission function according to an embodiment of the present invention with a lens barrier thereof being closed.

A sliding type lens barrier 101 is provided on the front surface of a camera main body 100. Further, a main switch (which is not shown and will be referred to as a BRSW hereinafter) is turned on by sliding this lens barrier 101 in a direction of an arrow illustrated in the drawing. As a result, the camera enters the operable state.

Furthermore, on the top surface of the camera main body 100, a flash device 102, an LCD display unit 103, a flash mode changeover switch (which will be referred to as an FLSSW hereinafter) 104, a self-timer switch (which will be referred to as an SLFSW hereinafter) 105, a release button 106, a zoom-up switch (which will be referred to as a ZUPSW hereinafter) 107, and a zoom-down switch (which will be referred to as a ZDNSW hereinafter) 108 are arranged.

The flash device 102 is a popup type flash device, and this flash device operates in cooperation with a lens barrel. As a result, the flash device 102 pops up from the accommodated state so as to be capable of emitting light.

The LCD display unit 103 is a liquid crystal display unit used to display various kinds of information of the camera.

The FLSSW 104 is a switch which can sequentially switch the flash mode of the camera to a red-eye prevention pre-light emission mode, a flash off mode, a forcible light emission mode, a night scene mode, a night scene red-eye flash mode, and a regular auto mode when being pressed down. The SLFSW 105 is a switch which can sequentially switch the self-timer mode of the camera to the self-timer mode, a remote control standby mode, and a regular mode when being pressed down. As to changeover of the flash mode or the self-timer mode, since a corresponding pattern is displayed in the LCD display unit 103, a camera operator can readily identify the switching.

The release button 106 is a two-stage switch that a first release switch (which will be referred to as a 1RSW hereinafter) is turned on when being pressed halfway and a second release switch (which will be referred to as a 2RSW hereinafter) is turned on when being completely pressed. The shooting operation is started by pressing this release button 106.

The ZUPSW 107 and the ZDNSW 108 are both switches operated in zooming. Zooming to the tele side is performed when the ZUPSW 107 is pressed down, and zooming to the wide side is carried out when the ZDNSW 108 is pressed down.

FIG. 2B is an external appearance view with the lens barrier 101 of the camera being opened. As described above, when the lens barrier 101 is opened by the sliding operation, the BRSW (not shown) is thereby turned on, and the camera shifts the lens barrel 114 from the collapsed state to the setup state (wide state in case of this camera). As a result, the lens barrel 114 is pulled out toward the front side. Moreover, in cooperation with this, the flash device 102 is popped up.

In addition, on the front surface of the camera main body 100, a finder window 110, a front display LED (which will be referred to as an FRLED hereinafter) light emission window 111, an AE window 112 and an AF window 113 are arranged, and the finder window 110, the FRLED light emission window 111, the AE window 112 and the AF window 113 are exposed and enter the operable state when the lens barrier 101 is opened.

The finder window 110 is an object window for a finder used by a camera operator to confirm a shooting range. Additionally, an FRLED which emits light in accordance with the operation state of the camera is arranged inside the FRLED light emission window 111. Further, an AE sensor (not shown) used to measure brightness in a field of an object is arranged inside the AE window 112. Furthermore, a measurement result of this AE sensor is used to control exposure. Moreover, an AF sensor (not shown) used to measure a distance between an object and the camera is arranged inside the AF window 113, and a measurement result is utilized for focusing.

FIG. 2C is a rear view of the camera. On the rear surface of the camera main body 100 are arranged an eyepiece 151 of the finder, an LED 152 used in AF display and a rear display LED (which will be referred to as an RELED hereinafter) 153.

Here, the eyepiece 151 of the finder is an ocular window for the finder used to observe an object or an angle of view by taking a look therein. Further, the AFLED 152 is an LED which displays a focusing state of the camera. In addition, the RELED 153 is an LED which displays presence/absence of light emission of the flash device 102 of the camera or the charge state of the flash capacitor.

A structure of a light emitting element of the FRLED provided inside the FRLED light emission window 111 will now be described with reference to FIG. 3A. That is, the FRLED 201 has a red color light emission LED chip (which will be referred to as a red chip hereinafter) 202, a green color light emission LED chip (which will be referred to as a green chip hereinafter) 203 and a blue color light emission LED chip (which will be referred to as a blue chip hereinafter) 204 arranged in close proximity with each other on a board 205 having an electrode (not shown) provided thereto, and each light emission chip and the electrode of the board 205 are connected by a method of, e.g., wire bonding. Additionally, transparent sealing such as clear molding is applied to the board 205 having the light emission chips connected therewith, thereby constituting the FRLED 201 having the respective light emission chips being packaged as one.

Further, FIG. 3B is a view showing a structure of a light emitting element of the RELED 153. That is, the RELED 153 has an orange color light emission LED chip (which will be referred to as an orange chip hereinafter) 252 and a green color light emission LED chip (which will be referred to as a green chip hereinafter) 253 arranged in close proximity to each other on a board 251 having an electrode (not shown) provided thereto, and each light emission chip and the electrode of the board 251 are connected by a method of, e.g., wire bonding. Furthermore, transparent sealing such as clear molding is applied to the board 251 having these light emission chips connected therewith, thereby constituting the RELED 153 having the respective light emission chips being packaged as one.

An electric circuit configuration inside the camera with the light emission function according to this embodiment will now be described with reference to FIG. 1.

A battery 301 supplies power required for the camera. A booster circuit 302 is constituted by, e.g., a DC—DC converter. This is allowed to operate by an arithmetic operation control portion (which will be referred to as a CPU hereinafter) 303, generates a voltage required for the IC or the like by boosting, and supplies it. The CPU 303 is an arithmetic operation control portion constituted by a one-chip microcomputer or the like, and controls a series of operations of the camera. A digital/analog (D/A) converter 303a is provided inside the CPU 303, and this D/A converter generates and outputs a voltage corresponding to settings of a register (not shown) provided inside the CPU to two output terminals DA1 and DA2.

A LED drive circuit 304 receives analog outputs DA1 and DA2 and digital outputs DR, DG, DB, DFG and DFO from the CPU 303 at corresponding input terminals. Moreover, the LED drive circuit 304 subjects outputs from the respective output terminals SR, SG, SB, SFG and SFO to constant current sink control based on the received inputs. The output terminals SR, SG, SB, SFG and SFO of the LED drive circuit 304 are connected to the cathode side of the respective LED chips provided to the FRLED 201 and the RELED 153. The drive operation of these LED chips will be described later in detail. In addition, the LED 152 used for the AF which displays the focusing state of the camera is also connected so as to be lighted when being controlled by the CPU 303 through a resistance R403.

A flash charging circuit 305 is controlled by the CPU 303 and boosts a battery voltage, and the flash charging circuit 305 stores the electric charge required for flash light emission in the flash capacitor C401. A flash light emission circuit 307 is controlled by the CPU 303 and causes a xenon tube 306 in the flash device 102 to emit light. It is to be noted that a charging voltage of the flash capacitor C401 is detected by a voltage detection circuit consisting of a resistance R401 and a resistance R402, and the detected voltage is inputted to the CPU 303.

A motor driver (which will be referred to as a motor DR hereinafter) 308 is controlled by the CPU 303, and controls to drive a zoom and film windup motor (which will be referred to as a WZMT hereinafter) 309, a zoom and film windup switching plunger (which will be referred to as a WZPL hereinafter) 310, a shutter plunger (which will be referred to as an SPL hereinafter) 311, and a focus motor (which will be referred to as an FMT hereinafter) 312. The WZ motor 309 performs zoom drive, and windup drive and rewind drive for a film by a drive force switching mechanism (not shown). Further, a WZ pulser 313 generates a pulse corresponding to a quantity of rotation of the WZ motor 309. The generated pulse is read by the CPU 303 and the CPU 303 controls a quantity of rotation of the WZ motor while making reference to the read pulse output.

Besides, an AF sensor 314, an AE sensor 315, and the LCD display unit 103 and others are also connected to the CPU 303, and these connected devices are also controlled by the CPU 303.

Furthermore, the above-described various kinds of switches are also connected to the CPU 303, and the CPU 303 detects the states of these switches and causes the camera to perform the operations corresponding to these switch states. It is to be noted that the BRSW 115 is the same as the main switch (BRSW) mentioned above, and this switch is turned on and thereby causes the camera to enter the operable state when the lens barrier 101 is opened.

The operation of the LED drive circuit 304 will now be described with reference to FIGS. 4A to 4E.

Figure 4A:
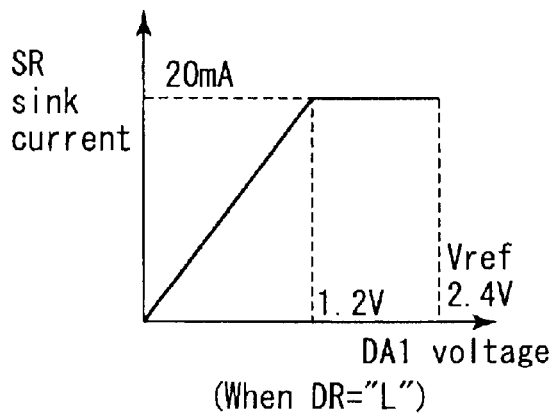
FIG. 4A is a graph showing a DA1 voltage-sink current characteristic in an SR terminal when a DR terminal of an LED drive circuit is in an "L" state.

FIG. 4A is a view showing a sink current at an SR terminal when a DR terminal is controlled to a "Low (L)" state by the CPU 303. At this moment, the LED drive circuit 304 subjects the SR terminal output to the current sink control by using a current corresponding to a voltage value of the DA1 terminal as shown in the drawing. However, in order to prevent the LED chip to be destroyed, the sink current is restricted to 20 mA or below. The red chip 202 of the FRLED 201 emits the light with a quantity of light which is substantially proportionate to the output current value of the SR terminal.

Figure 4B:
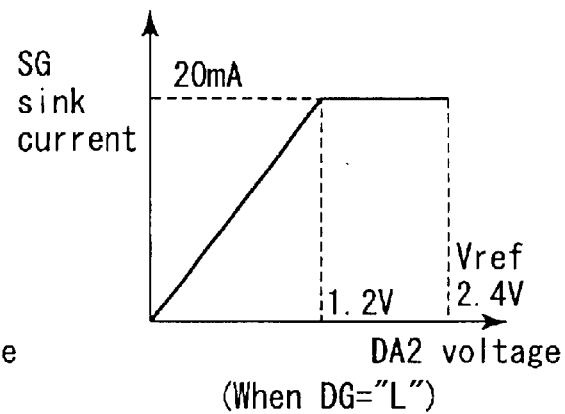
FIG. 4B is a graph showing a DA2 voltage-sink current characteristic in an SG terminal when a DG terminal of the LED drive circuit is in the "L" state.

FIG. 4B is a view showing a sink current at the SG terminal when the DG terminal is controlled to the "L" state by the CPU 303. At this moment, the LED drive circuit 304 subjects the SG terminal output to current sink control by using a current corresponding to the voltage value of the DA2 terminal as shown in the drawing. However, in order to prevent the LED chip from being destroyed, the sink current is restricted to 20 mA or below. The green chip 203 of the FRLED 201 emits the light with a quantity of light which is substantially proportionate to the output current value of the SG terminal.

Figure 4C:
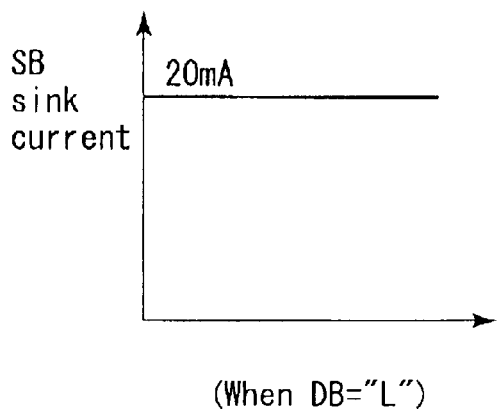
FIG. 4C is a graph showing a sink current characteristic in an SB terminal when a DB terminal of the LED drive circuit is in the "L" state.

FIG. 4C is a view showing a sink current at the SB terminal when the DB terminal is controlled to the "L" state. At this moment, the LED drive circuit 304 subjects the SB terminal output to current sink control to be 20 mA. It is to be noted that a quantity of emitted light of the blue chip 204 of the FRLED 201 is smaller than those of the LED chips of other colors, and the quantity of light does not have to be reduced by narrowing the current value. Therefore, when causing the blue chip 204 to emit the light, the blue chip 204 may be always driven at 20 mA.

Figure 4D:
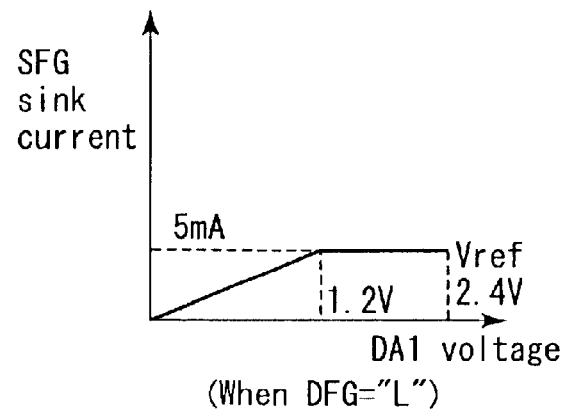
FIG. 4D is a graph showing a DA1 voltage-sink current characteristic in an SFG terminal when a DFG terminal of the LED drive circuit is in the "L" state.

FIG. 4D is a view showing a sink current at the SFG terminal when the DFG terminal is controlled to the "L" state by the CPU 303. At this moment, the LED drive circuit 304 subjects the SFG terminal output to current sink control by using a current corresponding to the voltage value of the DA1 terminal as shown in the drawing. However, since the LED on the rear surface, namely, the RELED 153 is close to eyes of a camera operator, the RELED 153 does not have to be caused to emit light very brightly. Therefore, in order to prevent the LED chip from being destroyed, the sink current is restricted to 5 mA or below. The green chip 253 of the RELED 153 emits the light with a quantity of light which is substantially proportionate to the output current value of the SFG terminal.

Figure 4E:
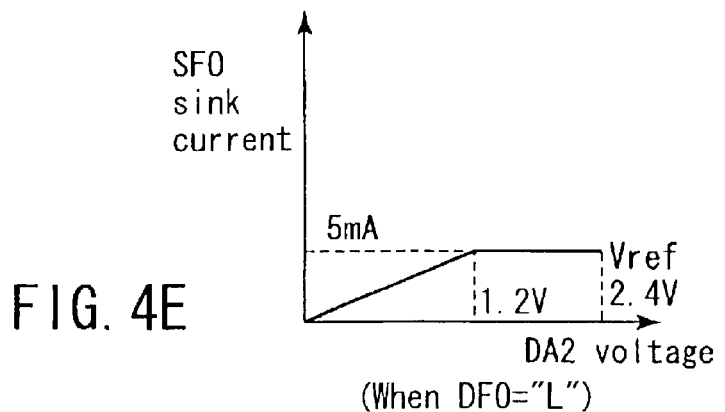
FIG. 4E is a graph showing a DA2 voltage-sink current characteristic in an SFO terminal when a DFO terminal of the LED drive circuit is in the "L" state.

FIG. 4E is a view showing a sink current at the SFO terminal when the DFO terminal is controlled to the "L" state by the CPU 303. In this case, the LED drive circuit 304 subjects the SFO terminal output to current sink control by using a current corresponding to the voltage value of the DA2 terminal as shown in the drawing. However, since the RELED 153 is close to eyes of a camera operator, the RELED 153 does not have to be caused to emit the light very brightly. Therefore, in order to prevent the LED chip from being destroyed, the sink current is restricted to 5 mA or below. The orange chip 252 of the RELED 153 emits the light with a quantity of light which is substantially proportionate to the output current value of the SFO terminal.

The drive control of the respective LED chips corresponding to various operations of the camera with the light emission function according to this embodiment will now be described. The CPU 303 of the camera judges the operation state of the camera. Then, the CPU 303 performs the light emission control over each LED chip by controlling the LED drive circuit 304 based on the judged operation state.

Figure 5:
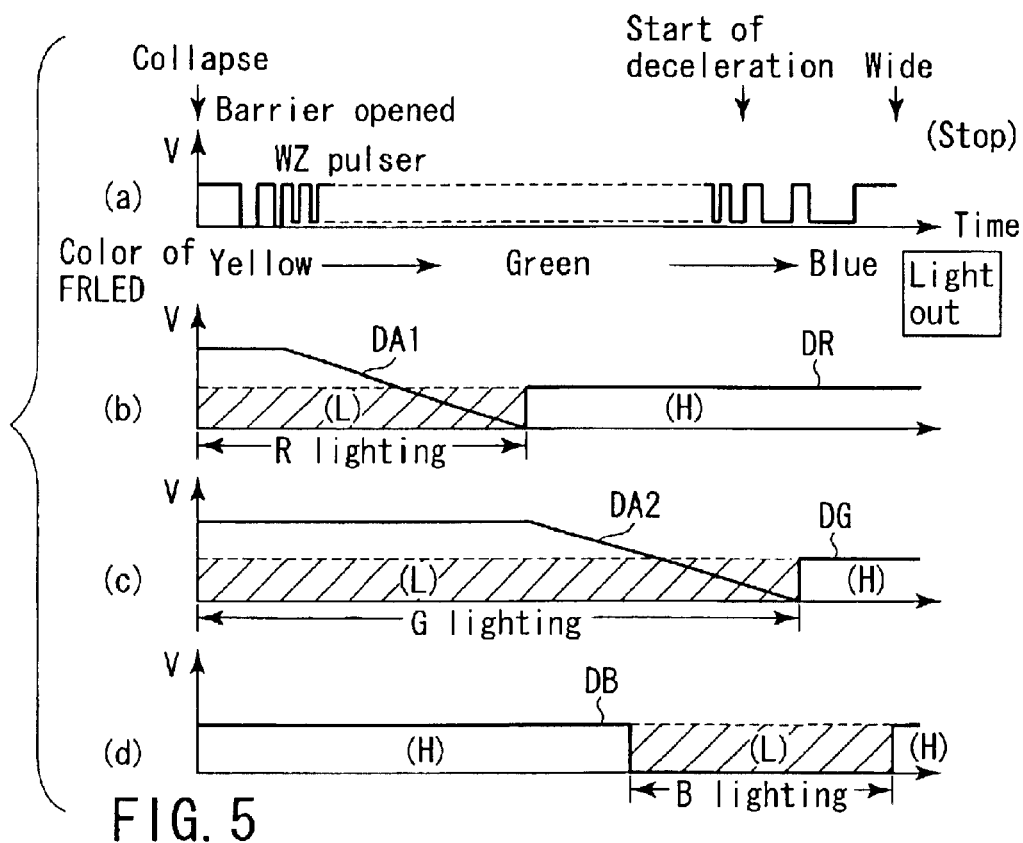
FIG. 5 is a timing chart for illustrating drive control of the front display LED (FRLED) while shifting a lens barrel from a collapsed state to a setup state by opening the lens barrier of the camera.

The description will be first given as to the drive control of the front display LED (FRLED) while the lens barrier 101 of the camera is opened and the lens barrel is shifted from the collapsed state to the setup state with reference to FIG. 5.

When the lens barrier 101 changes from the closed state to the opened state, the BRSW 115 is turned on. Upon detecting this state, the CPU 303 shifts the lens barrel 114 from the collapsed state to the wide state by controlling the motor DR 308 and driving the WZMT 309. At this moment, as indicated by a waveform (a) shown in FIG. 5, the WZ pulser 313 outputs a pulse. The CPU 303 counts the outputted pulse, and thereafter the CPU 303 performs drive control over the WZMT 309 corresponding to a predetermined pulse. Moreover, concurrently with the drive control over the WZMT 309, the CPU 303 performs light emission control over the respective chips of red, green and blue included in the FRLED 201 by controlling the LED drive circuit 304 as indicated by a waveform (b) to a waveform (d). It is to be noted that sections indicated by hatching in the waveform (b) to the waveform (d) represent that the respective chips are controlled to the "L" state and they are in the operating state. In addition, this is also applied in the subsequent drawings.

That is, at the start of the setup operation, since the CPU 303 controls so as to fully drive the red chip 202 and the green chip 203, the FRLED 201 emits the light of the substantially yellow color. Thereafter, since the CPU 303 reduces the drive current of the red chip 202 (namely, reduces the DA1 terminal voltage), the FRLED 201 gradually emits the light in the green color. In addition, since the CPU 303 thereafter reduces the drive current of the green chip 203 (namely, reduces the DA2 terminal voltage) and lights the blue chip 204, the light emission color of the FRLED 201 is gradually changed from the green color to the blue green color. At last, at the stop of the WZMT 309, since only the blue chip 204 is lighted, the FRLED 201 emits the light in the blue color. Then, upon completion of the drive of the lens barrel 114, the FRLED 201 is put off.

The drive control of the front display LED (FRLED) while zooming will now be described with reference to FIG. 6.

Figure 6:
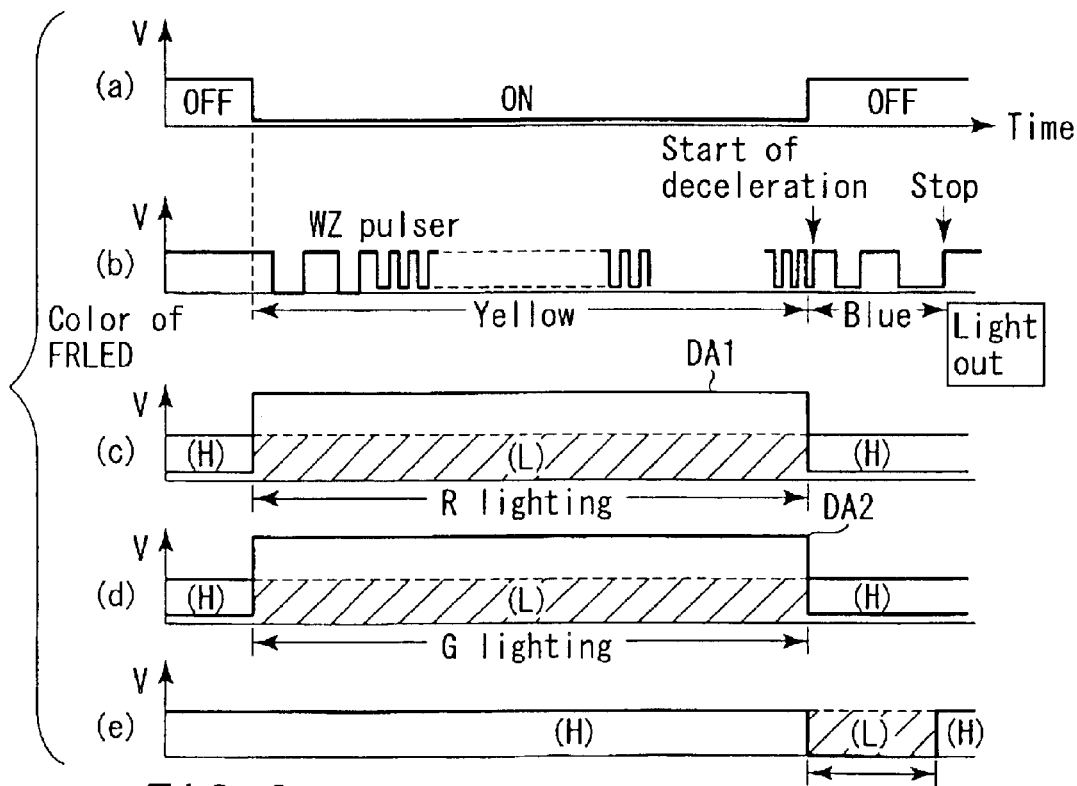
FIG. 6 is a timing chart for illustrating drive control of the front display LED (FRLED) in zooming.

When a camera operator has turned on the ZUPSW 107 or the ZDNSW 108 with a timing according to a waveform (a) shown in FIG. 6, the CPU which has judged the on state of any of these switches performs the drive control over the lens barrel 114 in the tele direction or the wide direction by controlling the motor DR 308 in accordance with the turned-on switch and driving the WZMT 309. At this moment, as indicated by a waveform (b), the pulse is outputted from the WZ pulser 313. The CPU 303 performs the drive control over the WZMT 309 by monitoring the WZ pulser 313. Thereafter, when the ZUPSW 107 or the ZDNSW 108 which has been operated by the camera operator is turned off, the CPU 303 stops the lens barrel 114 by performing deceleration control over the WZMT 309. Concurrently with the drive control of the WZ motor 309 mentioned above, the CPU 303 controls the respective chips of red, green and blue included in the FRLED 201 by controlling the LED drive circuit 304 as indicated by a waveform (c) to a waveform (e).

That is, since the CPU 303 controls so as to fully drive the red chip 202 and the green chip 203 at the start of the zoom operation and in the middle of the zoom operation, the FRLED 201 emits the light in the substantially yellow color. Thereafter, when zooming enters the deceleration operation by turning off the ZUPSW 107 or the ZDNSW 108 which has been in the on state, the CPU 303 lights only the blue chip 204, and hence the FRLED 201 emits the light in the blue color. Thereafter, upon completion of the drive of the lens barrel 114, the CPU 303 puts off the FRLED 201. It is to be noted that the CPU 303 causes only the blue chip to emit the light at the end of zooming irrespective of whether the ZUPSW 107 or the ZDNSW 108 is operated by the camera operator. Additionally, at this moment, the CPU 303 similarly causes only the blue chip 204 to emit the light in both cases of decelerating zooming or stopping zooming.

Figure 7:
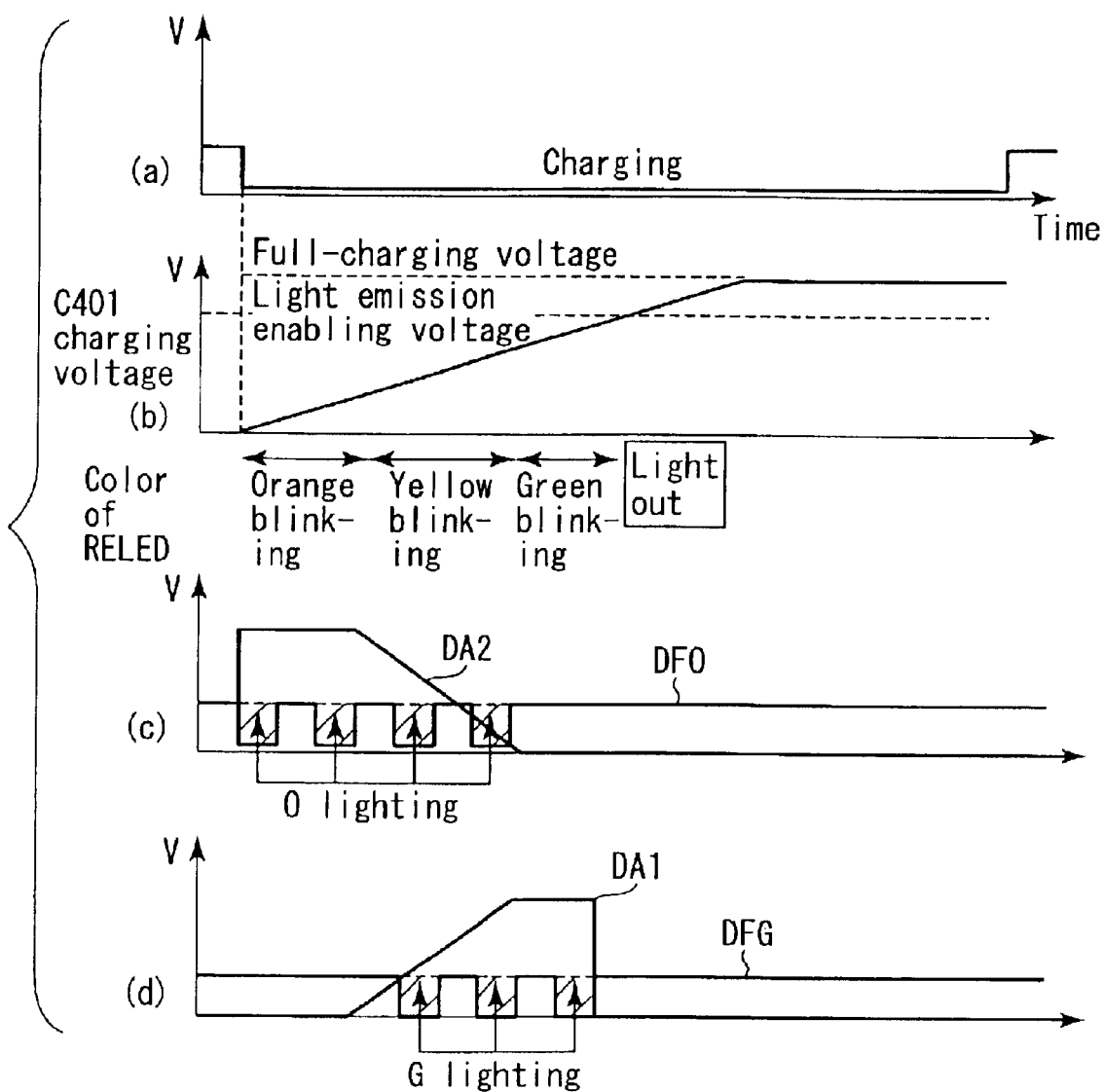
FIG. 7 is a timing chart for illustrating drive control of the rear LED (RELED) while charging a flash.

Description will now be given as to the drive control of the rear display LED (RELED) while performing flash charging with reference to FIG. 7.

When the CPU 303 judges that the flash must be charged, the CPU 303 generates a charging request signal to the flash charging circuit 305 and causes the flash charging circuit 305 to carry out charging. A waveform (a) shown in FIG. 7 indicates the state of the charging request signal at this moment. Further, a waveform (b) indicates the state of a voltage of the flash capacitor C401 which is being charged at this moment. Furthermore, a waveform (c) and a waveform (d) indicate the control states of the orange chip 252 and the green chip 253 of the RELED 153.

That is, the CPU 303 causes only the orange chip 252 to blink until a predetermined time elapses after start of charging. Then, the CPU 303 gradually reduces the drive current of the orange chip 252 and, on the other hand, increases the drive current of the green chip 253. At this moment, the RELED 153 blinks in such a manner that the color gradually changes from yellow to green. Moreover, in the vicinity of the flash light emission enabling voltage, the CPU 303 causes only the green chip 253 to blink. Thereafter, the CPU 303 puts off the RELED 153 when the voltage of the flash capacitor C401 becomes the flash light emission enabling voltage.

The drive control of the front display LED (FRLED) during the self-timer clocking will now be described with reference to FIGS. 8A and 8B.

When the camera is in the self-timer mode, clocking of the self-timer is started by pressing down the release button 106 by a camera operator. It is to be noted that the self-timer mode is the state that a symbol or an image indicating the self-timer mode is displayed in the LED display unit 103 as shown in FIG. 8A. When clocking of the self-timer such as indicated by a waveform (a) in FIG. 8B is started, the CPU 303 controls the respective chips of red, green and blue included in the FRLED 201 as indicated by a waveform (b) to a waveform (d) by controlling the LED drive circuit 304.

That is, when starting clocking of the self-timer, the CPU 303 causes red chip 202 to light up to display clocking. Then, when clocking of the self-timer reaches predetermined seconds, the CPU 303 reduces the drive current of the red chip 202 and increases the drive current of the green chip 203. As a result, the CPU 303 causes the FRLED 201 to emit the light in yellow to display clocking. Then, when clocking of the self-timer approaches an end, the CPU 303 puts off the red chip 202 and lights up only the green chip 203. Thereafter, the CPU 303 controls the green chip 203 to blink, and then the CPU 303 causes the blue chip 204 to blink and displays clocking. Subsequently, upon completion of clocking of the self-timer, the FRLED 201 is put off and the shooting operation is started.

Figure 9A:
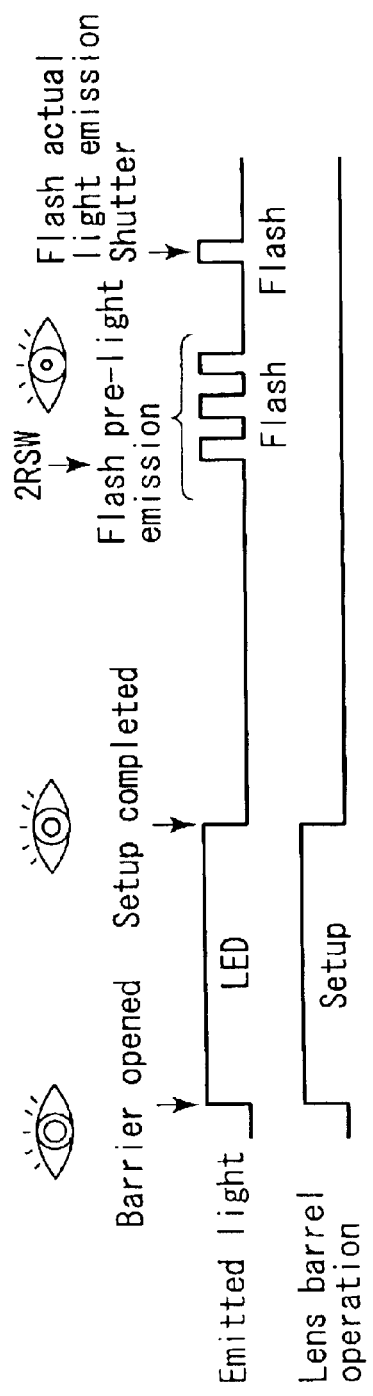
FIG. 9A is a view for illustrating a state of light emission from a front side of the camera and a contracted state of a pupil of an object when taking a picture by performing pre-light emission with respect to the object.
Figure 9B:
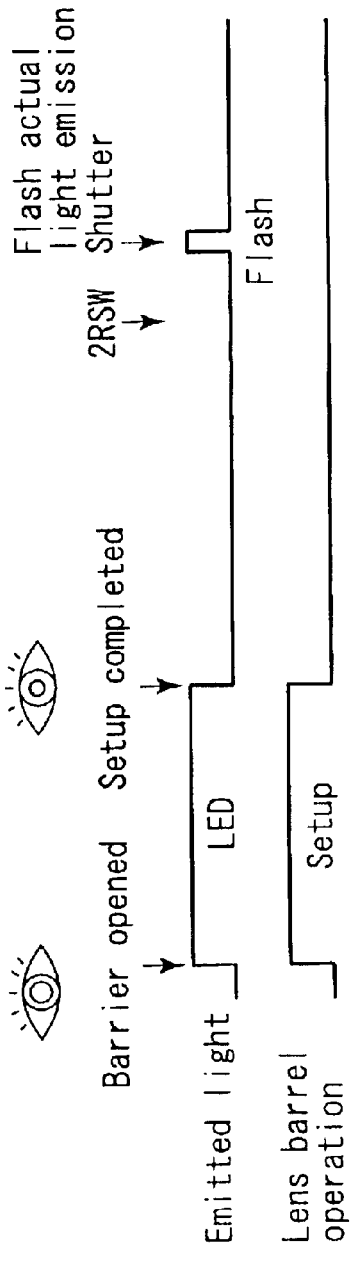
FIG. 9B is a view for illustrating a state of light emission from a front side of the camera and a contracted state of a pupil of an object when taking a picture without using pre-light emission with respect to the object.
Figure 9C:
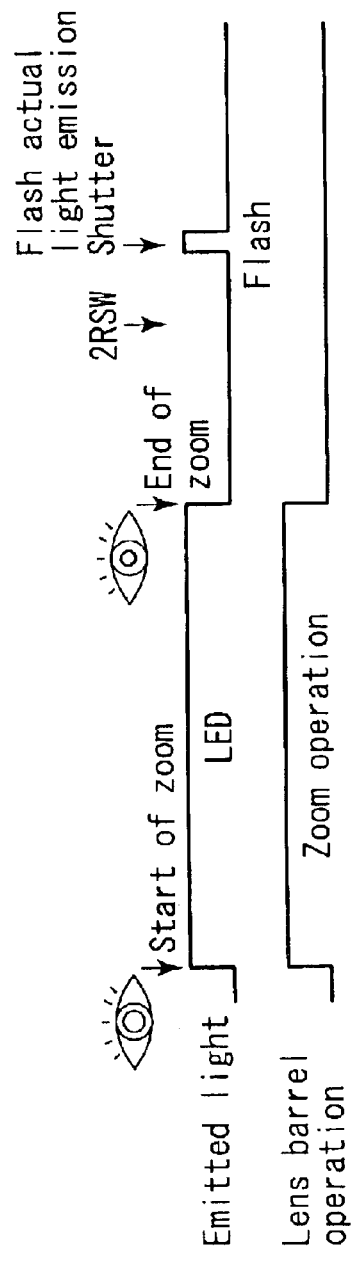
FIG. 9C is a view for illustrating a state of light emission from a front side of the camera and a contracted state of a pupil of an object when taking a picture by performing zooming.

FIGS. 9A to 9C are views showing statuses of light emission from the front surface of the camera after the lens barrier opening operation and after the zoom operation at the time of flash light emission.

FIG. 9A shows a status of light emission from the front surface of the camera when a power supply of the camera is turned on by changing the lens barrier 101 of the camera from the closed state to the opened state and then a picture is taken. Lighting of the FRLED 201 such as described in connection with FIG. 5 is performed while the lens barrel 114 enters the setup state after opening the lens barrier 101. As a result of lighting the FRLED 201, pupils of eyes of an object are slightly contracted (see patterns of an eye in FIG. 9A). Thereafter, when a camera operator turns on the release button 106, the pupils of the eyes of the object are further contracted by the flash pre-light emission before the shutter operation. Then, actual light emission of the flash which in synchronization with the shutter is performed, and a picture is taken. At this moment, by illuminating a person as the object with the light in accordance with the opening operation of the lens barrier 101 which is required before using the camera, eyes of that person are stimulated, and hence the object feels less dazzled by the light at the time of pre-light emission. Furthermore, since the pupils of the person before shooting are further contracted as compared with the case of using only the pre-light emission, thereby increasing the effect of avoiding a red-eye picture.

FIG. 9B shows a status of light emission from the front surface of the camera when the pre-light emission mode of the camera is not set with respect to the example of FIG. 9A. In this example, since the FRLED 201 is likewise lighted up by the opening operation of the lens barrier 101 which is carried out before shooting, the pupils of a person are contracted to some degree, although it is not greater than the degree in case of pre-light emission of the flash. Therefore, even when the pre-light emission mode is not set in order to attach importance to a release time lag, the red-eye prevention effect can be likewise obtained.

FIG. 9C shows a status of light emission from the front surface of the camera when taking a picture after performing zooming. When the FRLED 201 is lighted up in cooperation with zooming, the pupils of the eyes of a person as an object are slightly contracted. Thereafter, the shooting operation is carried out when the release button 106 is turned on by a camera operator. In this case, reduction in dazzling or red-eye prevention can be also achieved as with description in connection with FIGS. 9A and 9B.

A method of inspecting an element mounted on a printed circuit as another example of this embodiment will now be described. It is to be noted that description will be given as to a method of inspecting an AF sensor mounted on an AF flexible printed circuit (which will be referred to as an AFFPC hereinafter) and a method of vertical adjustment of the AF sensor mounted on the AF flexible printed circuit in this embodiment but the present invention is not restricted thereto.

The FRLED 201, the AF sensor 314, the AE sensor 315 and others of this embodiment are mounted on the AFFPC, and the acceptability of the AF sensor 314 can be judged when an operator sees a display color of the FRLED 201.

Figure 10A:
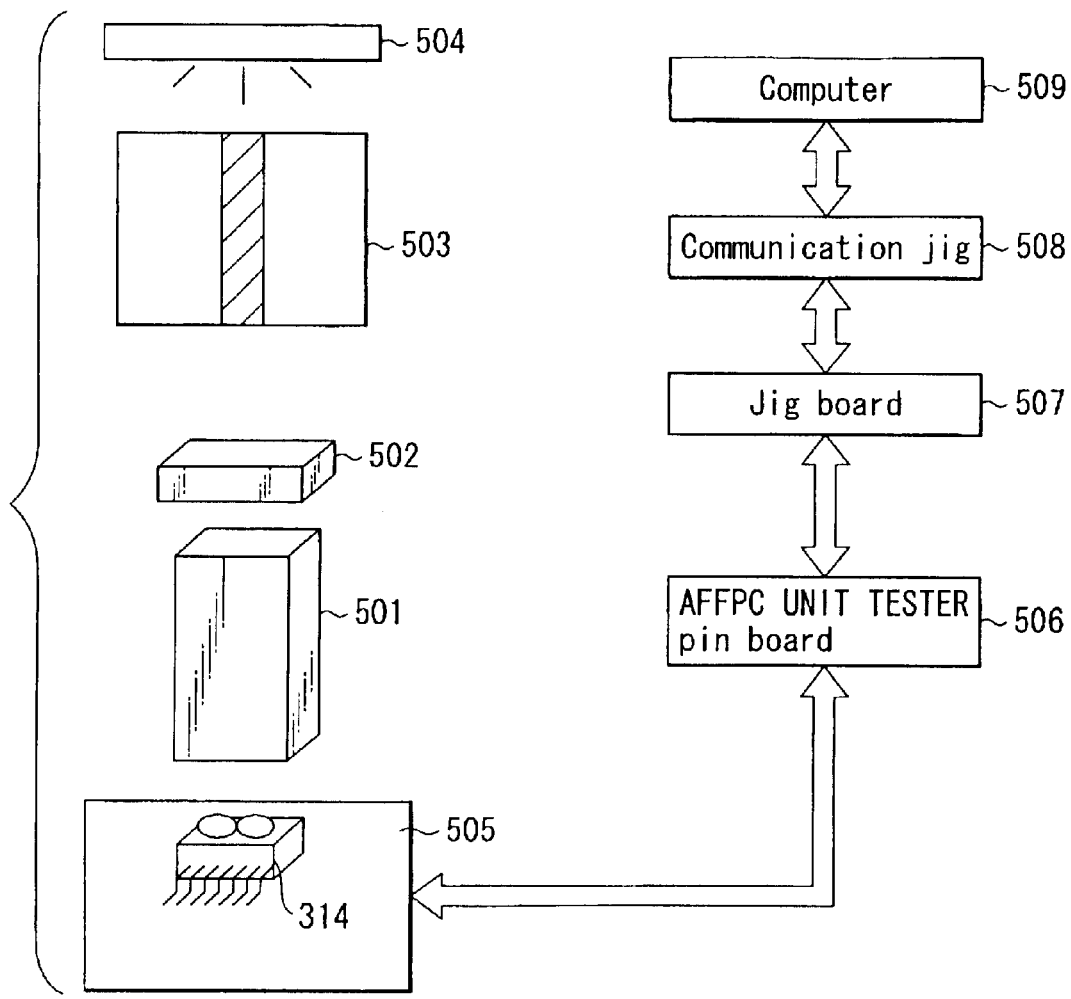
FIG. 10A is a view for illustrating an outline of an inspection apparatus for an AF sensor mounted on an AF flexible printed circuit.

FIG. 10A is a view showing the outline of the AF sensor inspection apparatus on the AFFPC. In such an apparatus, an operator first performs distance measuring with a light shielding cylinder 501 and a light shielding cover 502 being put on the AF sensor 314. Then, the operator removes the light shielding cover 502, and carries out distance measuring with respect to a chart 503 with a predetermined pattern under an illumination 504 having a predetermined brightness. A result of performing distance measuring in this manner is fetched into a computer 509 through a communication jig 508, and then the acceptability of the AF sensor 314 is judged by the computer 509.

Figure 10B:
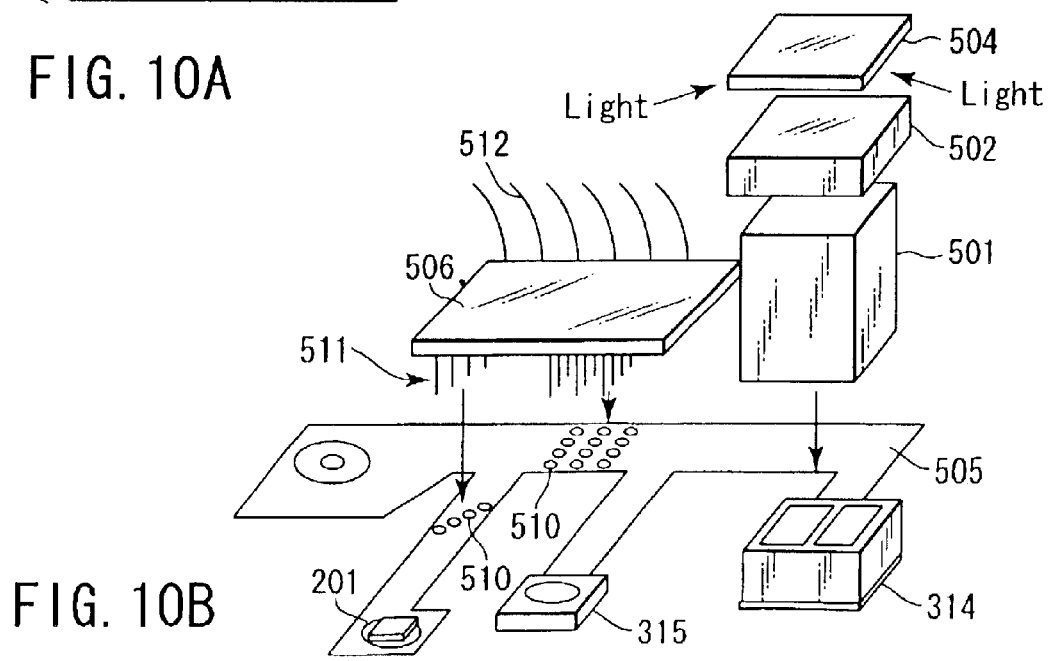
FIG. 10B is a view for illustrating a concrete structure of the inspection apparatus for the AF sensor mounted on the AF flexible printed circuit.

More specifically, when a probe pin 511 arranged on a pin board 506 is connected to a communication land 510 provided on the AFFPC 505 which is in the developed state as shown in FIG. 10B, the electrical connection between the AFFPC 505 and the pin board 506 is achieved. At this moment, the computer 509 connected through a lead wire 512, a jig board 507 and a communication jig 508 can control the entire AF sensor inspection apparatus.

Figure 11A:
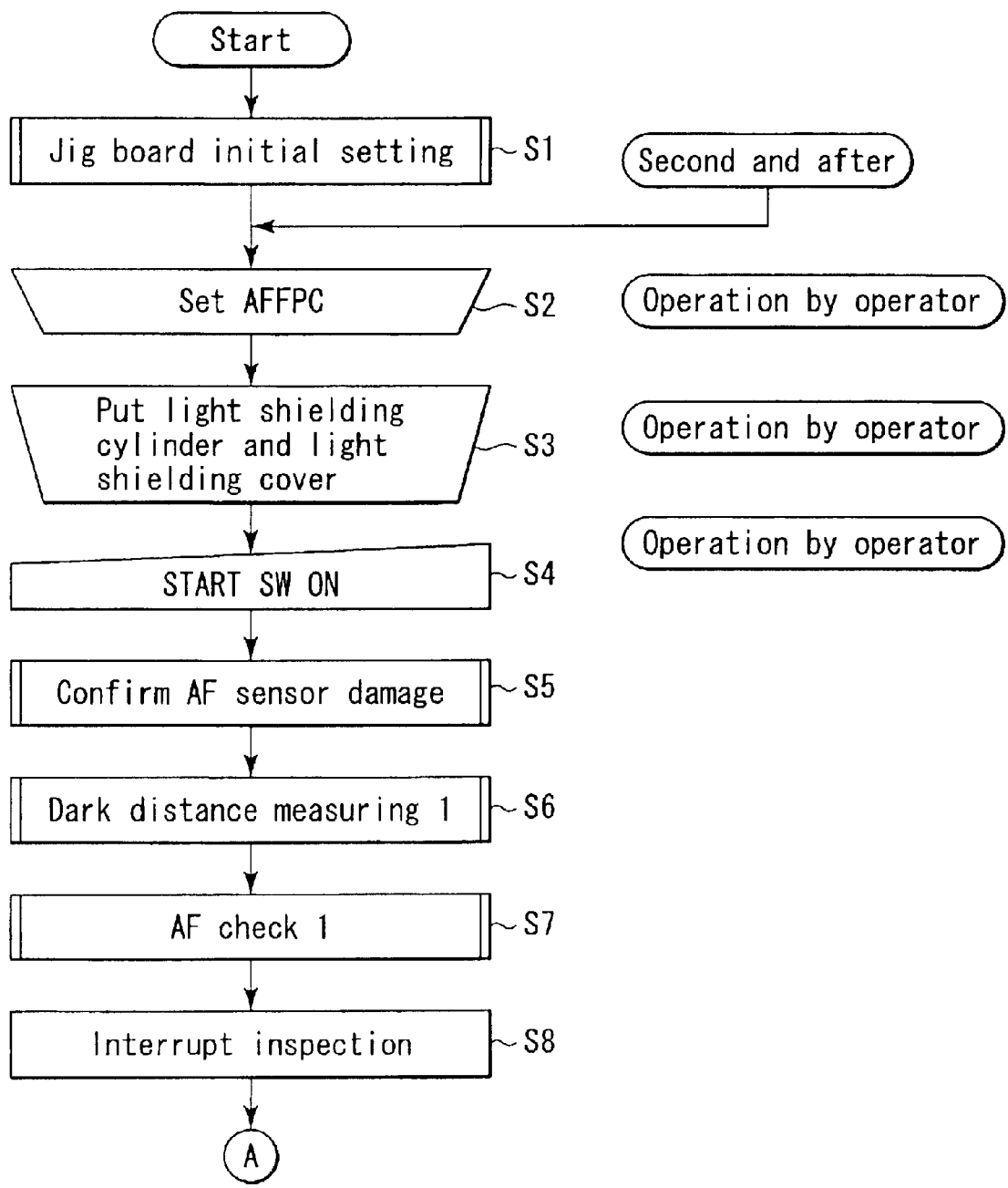
FIG. 11A and FIG. 11B are flowcharts showing continuous procedures of inspection for the AF sensor mounted on the AF flexible printed circuit.
Figure 11B:
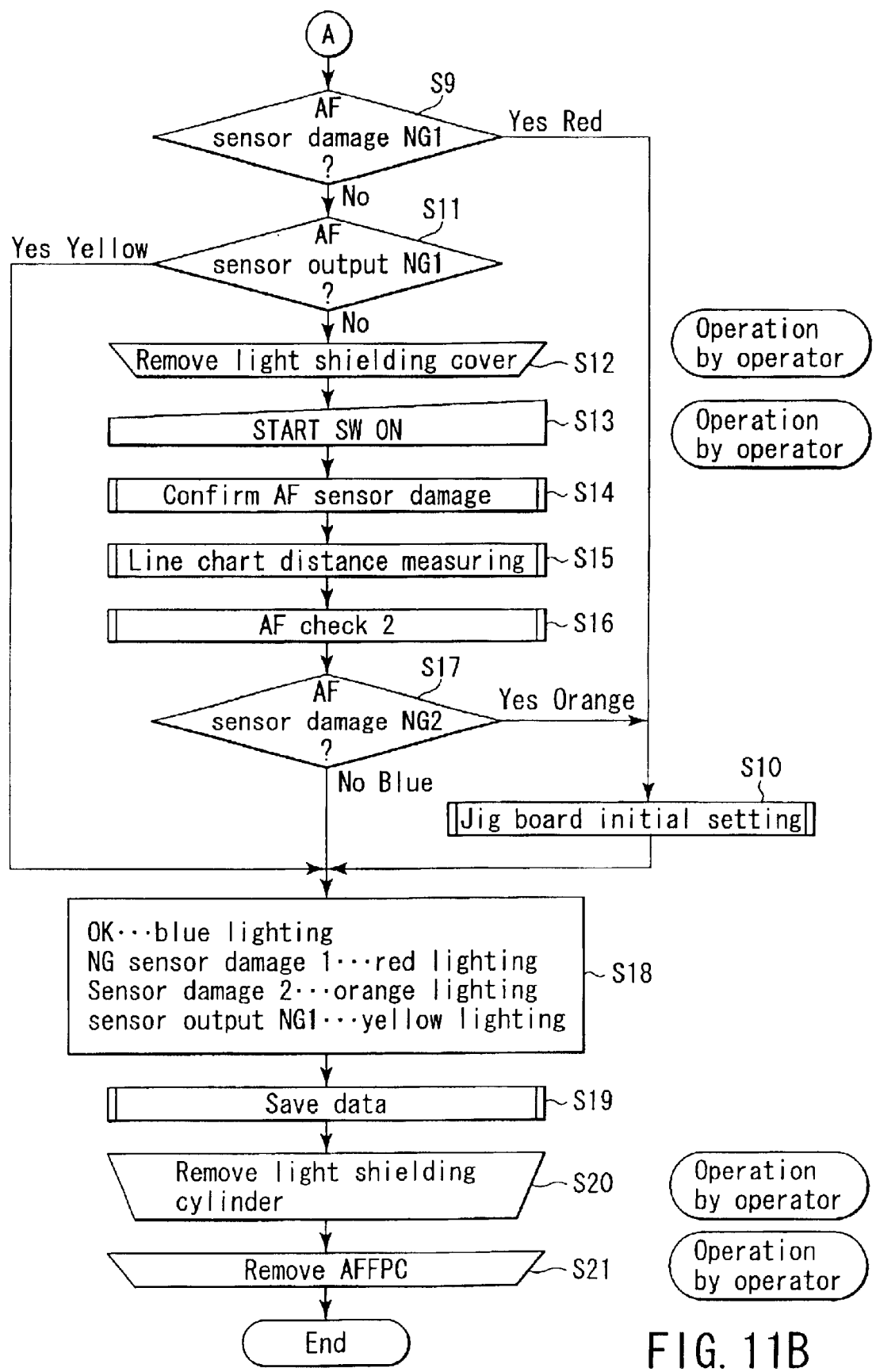

FIG. 11A and FIG. 11B are flowcharts showing continuous procedures of processing for inspecting the AFFPC by using an AFFPC inspection apparatus.

The computer 509 first performs initial setting of the jig board 507 which can set a voltage value or the like in order to inspect an element of the AFFPC 505 (step S1).

Subsequently, an operator connects the pin board 506 to the AFFPC 505 (step S2), and then puts the light shielding cylinder 501 and the light shielding cover 502 on the AF sensor 314 (step S3). Then, the operator turns on a start switch (which will be abbreviated as STARTSW in the drawing) of the computer 509 and starts inspection (step S4). It is to be noted that the STARTSW may be a specific key on a keyboard of the computer 509 or a key in software which operates a button displayed in a screen of the computer by using a pointing device.

Thereafter, the computer 509 performs inspection about a damage (this damage includes a short-circuit or opening in a circuit) to the AF sensor 314 (step S5). Then, the computer 509 causes the AF sensor 314 to perform distance measuring in the light shielding state (step S6). After detecting a measuring output of the AF sensor 314 (step S7), the computer 509 suspends inspection of the AF sensor 314 (step S8).

Information concerning the state of AF sensor 314 inspected at the step S5 and the step S6 is transferred to the computer 509. The computer 509 judges the acceptability of the AF sensor 314 based on the transferred information.

The computer 509 first judges whether there is a damage to the AF sensor 314 (step S9). When the computer 509 has judged that there is a damage to the AF sensor 314, the computer 509 returns the setting of the jig board 507 to an initial value (step S10). It is to be noted that the computer 509 causes the FRLED 201 to emit the light in red at this moment. Thereafter, the processing advances to a step S18.

On the other hand, if the computer 509 has determined that there is no damage to the AF sensor 314 in judgment at the step S9, the computer 509 then judges whether a measuring output obtained by performing distance measuring in the light shielding state is an output based on the standard (step S11). If the computer has determined that the measuring output obtained by performing distance measuring in the light shielding state is the output based on the standard, the processing advances to a next step S12.

On the other hand, if the computer has determined that the measuring output obtained by performing distance measuring in the light shielding state is an output which is not based on the standard in judgment at the step S11, the processing proceeds to a step S18.

If the computer has determined that the AF sensor 314 is in good order as a result of judgment at the step S10 and the step S1, an operator removes the light shielding cover 502 from the AF sensor 314 (step S12). Then, the operator again turns on the STARTSW of the computer 509, and restarts inspection of the AF sensor 314 (step S13).

In the next processing, the computer 509 again performs inspection about a damage to the AF sensor 314 (step S14). Subsequently, the computer 509 causes the AF sensor 314 to carry out distance measuring with respect to a chart 503 with a predetermined pattern under the illumination 504 with a predetermined brightness. Then, after detecting a measuring output (step S15), the computer 509 suspends inspection of the AF sensor 314 (step S16).

Information concerning the state of the AF sensor 314 inspected at the step S14 and the step S15 is transferred to the computer 509. The computer judges the acceptability of the AF sensor 314 based on the transferred information.

The computer 509 first judges whether there is a damage to the AF sensor 314 (step S17). If the computer 509 has determined that there is a damage to the AF sensor 314, the computer 509 returns the setting of the jig board 507 to an initial value (step S10). Then, the processing advances to the step S18.

On the other hand, if the computer 509 has determined that there is no damage to the AF sensor 314 in judgment at the step S17, the processing directly proceeds to the next step S18.

Based on results of inspection in the dark state at the step S6 and inspection under a predetermined illumination at the step 15, the computer 509 causes the FRLED 201 to emit the light at the step S18. Incidentally, in this embodiment, if the computer has determined that the AF sensor 314 is in good order, the computer 509 lights up the blue chip 204 of the FRLED 201. Moreover, if the computer 509 has determined that the AF sensor 314 is not in good order in judgment at the step S9, the computer 509 causes the red chip 202 of the FRLED 201 to blink. In addition, if the computer 509 has determined that there is a damage to the AF sensor 314 in judgment at the step S17, the computer 509 causes the FRLED 201 to blink in the orange color by causing the red chip 202 and the green chip 203 to blink. In addition, if the computer has determined that the measuring output of the AF sensor 314 is not based on the standard in judgment at the step S11, the computer lights up the FRLED 201 in yellow by causing the red chip 202 and the green chip 203 to emit the light.

Upon completion of display of the FRLED 201, the computer 509 stores the results of inspection performed so far (step S19). Then, an operator removes the light shielding cylinder 501 (step S20). Subsequently, the operator removes the pin board 506 from the AFFPC 505 (step S21), thereby terminating the inspection.

By performing inspection of the AF sensor in this manner, the operability is good since the operator can recognize an error by confirming the lighting state of the FRLED 201 provided in the vicinity of the light shielding cylinder even if a sight line of the operator is directed toward the light shielding cylinder. Additionally, if the operator performs inspection by using the FRLED 201 provided to the camera in the first place, another display member does not have to be provided to the inspection apparatus, thereby readily configuring the inspection apparatus.

Description will now be given as to an AF sensor vertical adjustment apparatus which utilizes a technique of the light emission control of the LED according to the embodiment mentioned above.

FIG. 12A shows an outline of the vertical adjustment of the AF sensor 314. In adjustment, an operator first connects the pin board 506 to the AFFPC 505. The pin board 506 is connected to the computer 509 through the communication jig 508 so as to enable control over the AFFPC 505 from the computer 509.

In the adjustment, as shown in FIG. 12B, the operator attaches the AFFPC 505 on the finder 110, thereby obtaining a finder unit. In this state, the operator achieves the electrical connection by press-fitting the probe pin 511 to the communication land 510 on the AFFPC 505, and then operates an AF vis 517. In a chart 513 used in this adjustment, such an oblique line as shown in FIG. 12A periodically rotates at an angle of ±45 degrees. A change in output pattern obtained by distance measuring by the AF sensor 314 while the oblique line is rotating indicates a quantity and a direction of displacement of the AF sensor 314 in the vertical direction.

Figure 13A:
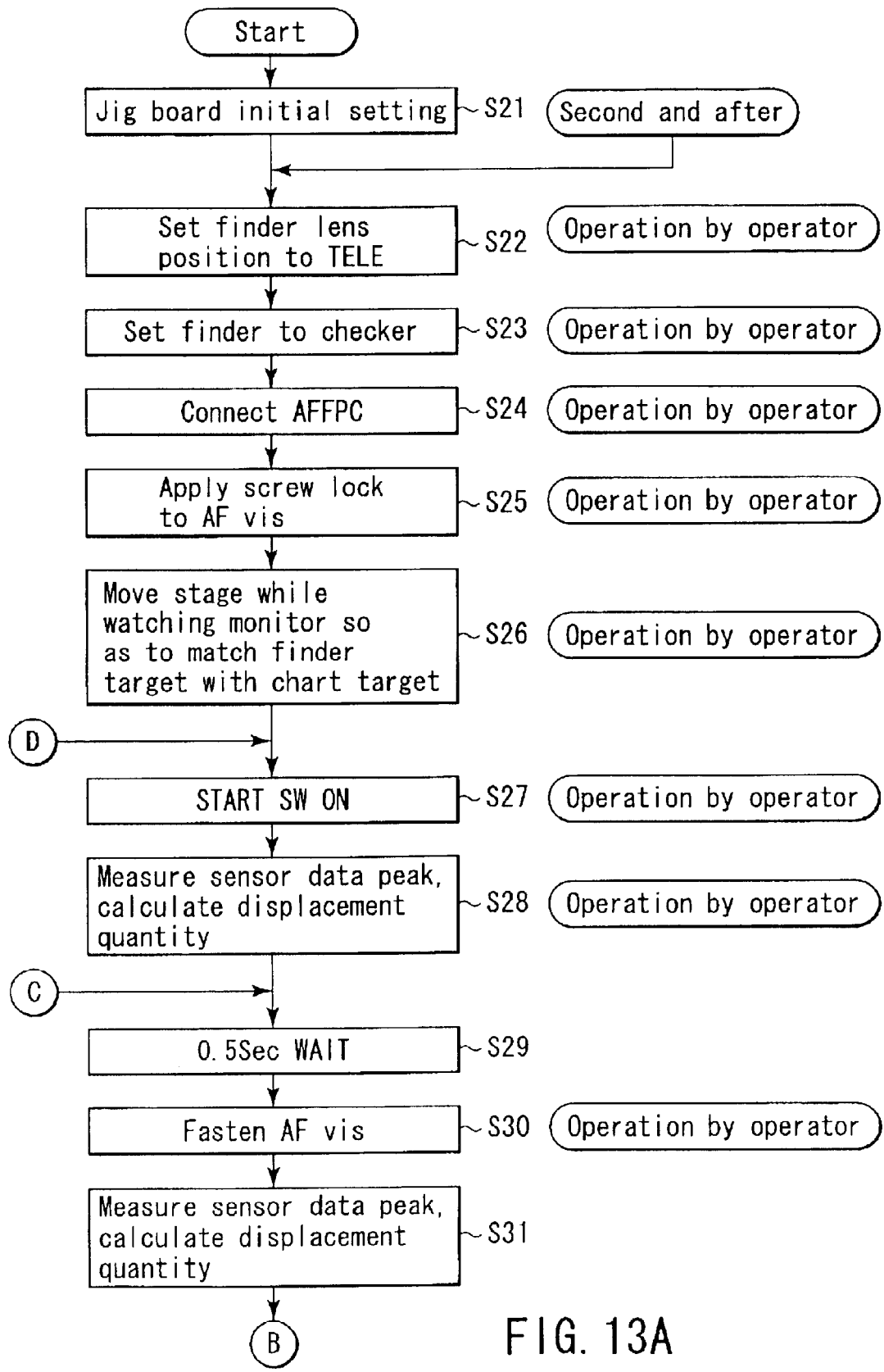
FIG. 13A and FIG. 13B are flowcharts showing continuous procedures of adjustment of the AF sensor mounted on the AF flexible printed circuit.
Figure 13B:
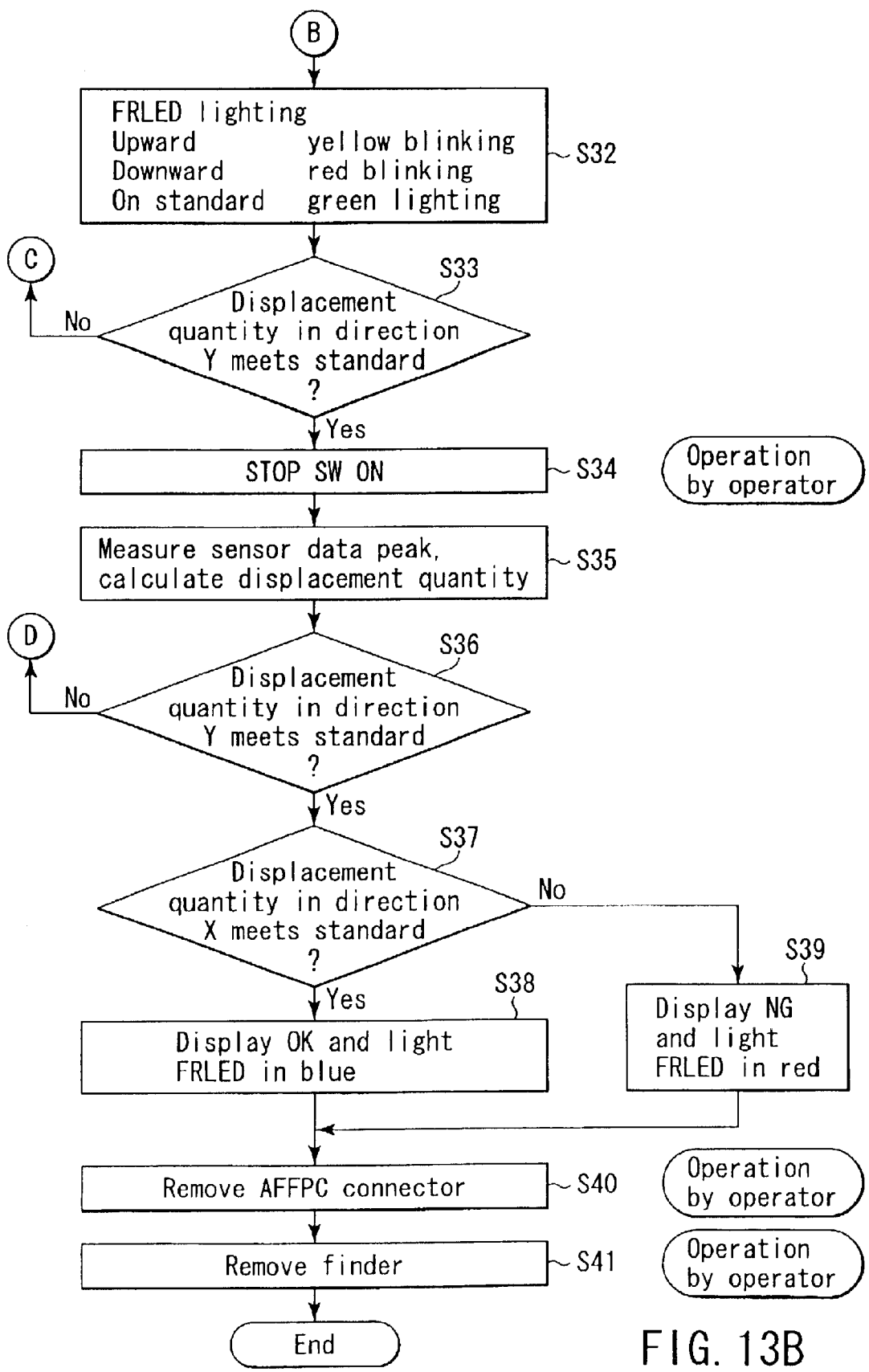

The outline of adjustment will now be described with reference to flowcharts of FIG. 13A and FIG. 13B.

The computer 509 first performs initial setting of the jig board 507 which can set a voltage value and the like for element inspection (step S21) Then, an operator sets a lens position of the finder to the "TELE" side (step S22). Subsequently, the operator sets the finder unit on an XY stage of a checker (step S23) Then, the operator connects the AFFPC 505 and the pin board 506 with each other (step S24) Thereafter, the operator applies screw locking to the AF vis 517 (step S25) Then, the operator operates the XY stage while watching a monitor 515 which displays a field of view of the finder 110 imaged by a CCD camera 514, and moves the finder 110 in such a manner that a finder target in the field of view of the finder 110 matches with a chart target of the chart 513 (both are not shown) (step S26)

After the above-described operations, the operator causes the computer 509 to start inspection of the AF sensor 314 by turning on the STARTSW 516 of the computer 509 (step S27). After start of inspection, the computer 509 detects maximum data in sensor data outputted by the AF sensor 314. Then, the computer 509 calculates a quantity of displacement between the detected maximum sensor data and a predetermined value (step S28). Subsequently, after elapse of 0.5 second (step S29), the operator performs the operation to fasten the AF vis 517 (step S30). Then, the computer 509 again calculates a quantity of displacement between the maximum sensor data and the predetermined value in this state (step S31).

Now, the computer 509 causes the FRLED 201 to emit the light based on results of calculation at the step S28 and the step S31 (step S32). At this moment, if the AF sensor 314 is displaced in the lower direction, the computer 509 causes the FRLED 201 to blink in red by causing the red chip 202 to blink. Further, if the AF sensor 314 is displaced in the upper direction, the computer 509 causes the FRLED 201 to blink in yellow by causing the red chip 202 and the green chip 203 to blink. Furthermore, if a quantity of displacement between the maximum sensor data and the predetermined value meets the standard, the computer 509 causes the FRLED 201 to emit the light in green by lighting on the green chip 203.

The operator can recognize whether a quantity of displacement of the AF sensor 314 in the direction Y meets the standard by watching a light emission color of the FRLED 201 (step S33). If a quantity of displacement in the direction Y does not meet the standard, namely, if the FRLED 201 emits the light in red or yellow, the processing returns to the step S29, and the operator again performs adjustment of a position of the AF sensor 314 in the vertical direction.

On the other hand, if a quantity of displacement of the AF sensor 314 in the direction Y meets the standard, namely, the FRLED 201 emits the light in green, the operator manipulates a STOP switch (which will be abbreviated as STOPSW in the drawing) of the computer 509 and interrupts inspection of the AF sensor 314 by the computer 509 (step S34).

Thereafter, the computer 509 again calculates a quantity of displacement of the sensor data, and causes the FRLED 201 to emit the light based on a result of this calculation (step S35). The operator who has seen a color of this light emission confirms that a quantity of displacement of the AF sensor 314 in the direction Y meets the standard (step S36). If a quantity of displacement of the AF sensor 314 in the direction Y does not meet the standard, the processing returns to the step S27, and the operator again performs adjustment of the AF sensor 314 in the vertical direction.

On the contrary, if a quantity of displacement of the AF sensor 314 in the direction Y meets the standard, the computer 509 judges whether a quantity of displacement of the AF sensor 314 in the direction X meets the standard (step S37). Then, the computer 509 lights on the FRLED 201 based on a result of this judgment. At this moment, if the computer 509 has determined that a quantity of displacement of the AF sensor 314 in the direction X meets the standard, the computer 509 causes the FRLED 201 to emit the light in blue by lighting on the blue chip 204 (step S38). On the other hand, if the computer 509 has determined that a quantity of displacement of the AF sensor 314 in the direction X does not meet the standard, the computer 509 causes the FRLED 201 to emit the light in red by lighting up the red chip 202 (step S39).

After the FRLED 201 has emitted the light in any color, the operator who has confirmed that a color of light emission is blue removes the pin board 506 from the AFFPC 505 (step S40). Thereafter, the operator removes the finder unit (step S41). As a result, adjustment of the AF sensor 314 in the vertical direction is terminated.

As described above, the operator changes the vertical direction of the AF sensor 314 by turning the AF vis 517 for adjustment while watching the vertical displacement of the AF sensor 314 displayed based on data obtained by distance measuring using the AF sensor in accordance with a periodic change in the chart 513. At this moment, the direction of displacement is also displayed in the monitor 515, and a color of light emission of the FRLED 201 attached to the finder 110 also varies at the same time. Therefore, the direction of adjustment can be clearly recognized even if a quantity of movement of a sight line of the operator is small. Consequently, the working efficiency of adjustment of the AF sensor is improved.

It is to be noted that the operator may be possible to confirm how much the displacement of the AF sensor 314 has approximated the adjustment standard by finely changing a color of light emission of the FRLED 201 as another embodiment. Moreover, the operator may be possible to confirm how much the displacement of the AF sensor 314 has approximated the adjustment standard by changing a blinking period of the FRLED 201.

Figure 14A:
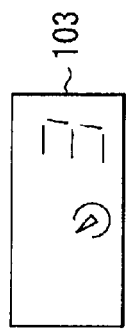
FIG. 14A is a view for illustrating display showing the self-timer mode.
Figure 14B:
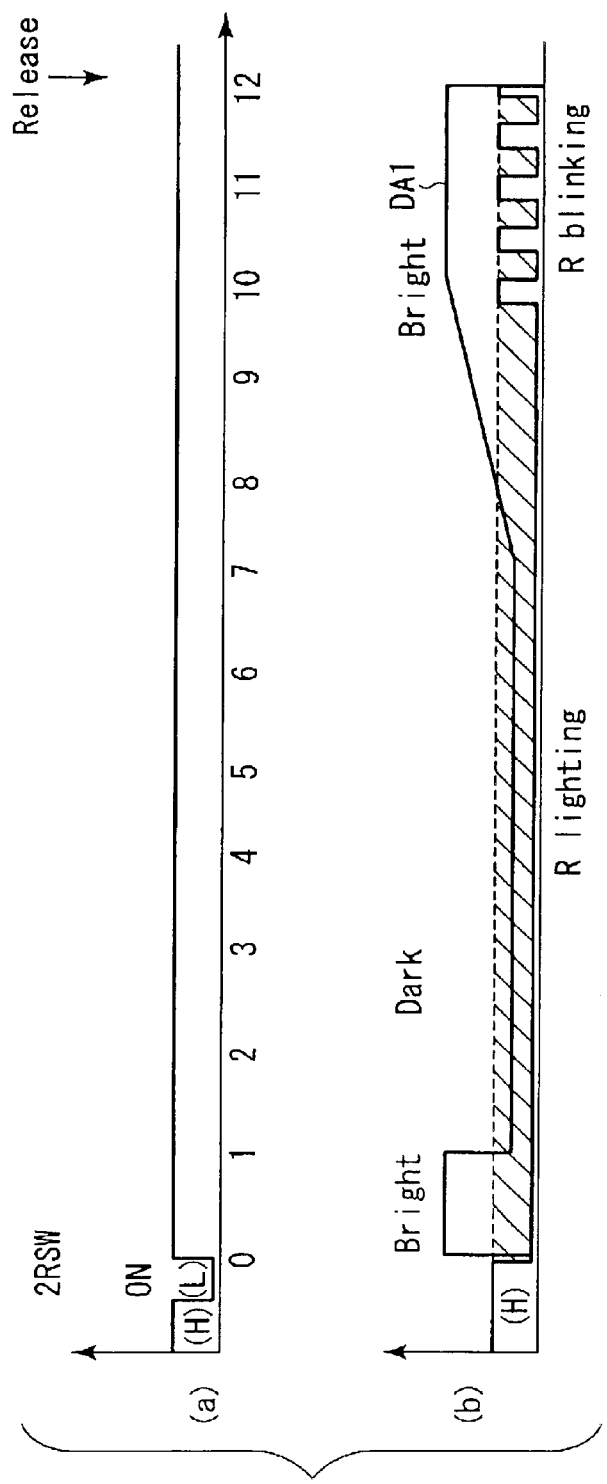
FIG. 14B is a timing chart for illustrating another embodiment of light emission control of the FRLED when the self-timer is operating.

Another embodiment of the light emission control of the FRLED 201 while the self-timer is operating will now be described with reference to FIGS. 14A and 14B. It is to be noted that only the red chip 202 is used when the self-timer performs clocking in the self-timer mode that such display as shown in FIG. 14B is carried out in this embodiment. That is, an object can confirm the state of the self-timer by changing the brightness of the red chip 202 with time.

In the self-timer mode, when a camera operator turns on the 2RSW of the release button 106 with the timing according to a waveform (a) shown in FIG. 14B, the CPU 303 first lights up the red chip 202 with a maximum quantity of light for a predetermined time (one second in this embodiment) as indicated by a waveform (b). Light emission of the red chip 202 with a maximum quantity of light is light emission to clearly inform that the camera has entered the self-timer mode.

Then, the CPU 303 reduces the brightness of the red chip 202. Subsequently, the brightness of the red chip 202 is maintained for several seconds (six seconds in this embodiment). Thereafter, in the last half of clocking of the self-timer, the CPU 303 gradually increases the brightness of the red chip 202 and, at last, the CPU 303 causes the red chip 202 to blink with a maximum quantity of light. Then, the CPU 303 simultaneously drives the FMT 312 by controlling the motor DR. Then the lens is focused on the object. Moreover the CPU 303 controls the motor DR 308 and causes the SPL 311 to drive. As a result, the shutter is driven and the release operation is effected.

It is to be noted that the same color is prevented from being used when performing clocking of the self-timer and carrying out display other than the self-timer.

That is, when performing clocking of the self-timer, display is carried out in red which is generally used, and hence an object can be assuredly prevented from being confused with the operation state of the camera when performing clocking of the self-timer and effecting display other than the self-timer. Moreover, an object can readily recognize the elapsed state of the self-timer by changing a quantity of light with time even though clocking display is performed in monochrome. Therefore, a person as the object can easily perform preparation for being taken a picture.

It is to be noted that the red light emission chip is used to display clocking of the self-timer in this embodiment but any other color may be used. In addition, the timing of blinking may be arbitrarily changed.

Still another embodiment of the present invention will now be described with reference to FIG. 15. In this embodiment, the FRLED is subjected to light emission control in accordance with the operation state of the release button 106.

Description will be first given as to the light emission control carried out by the CPU 303 when the 1RSW and the 2RSW included in the release button 106 are sequentially turned on.

Figure 15:
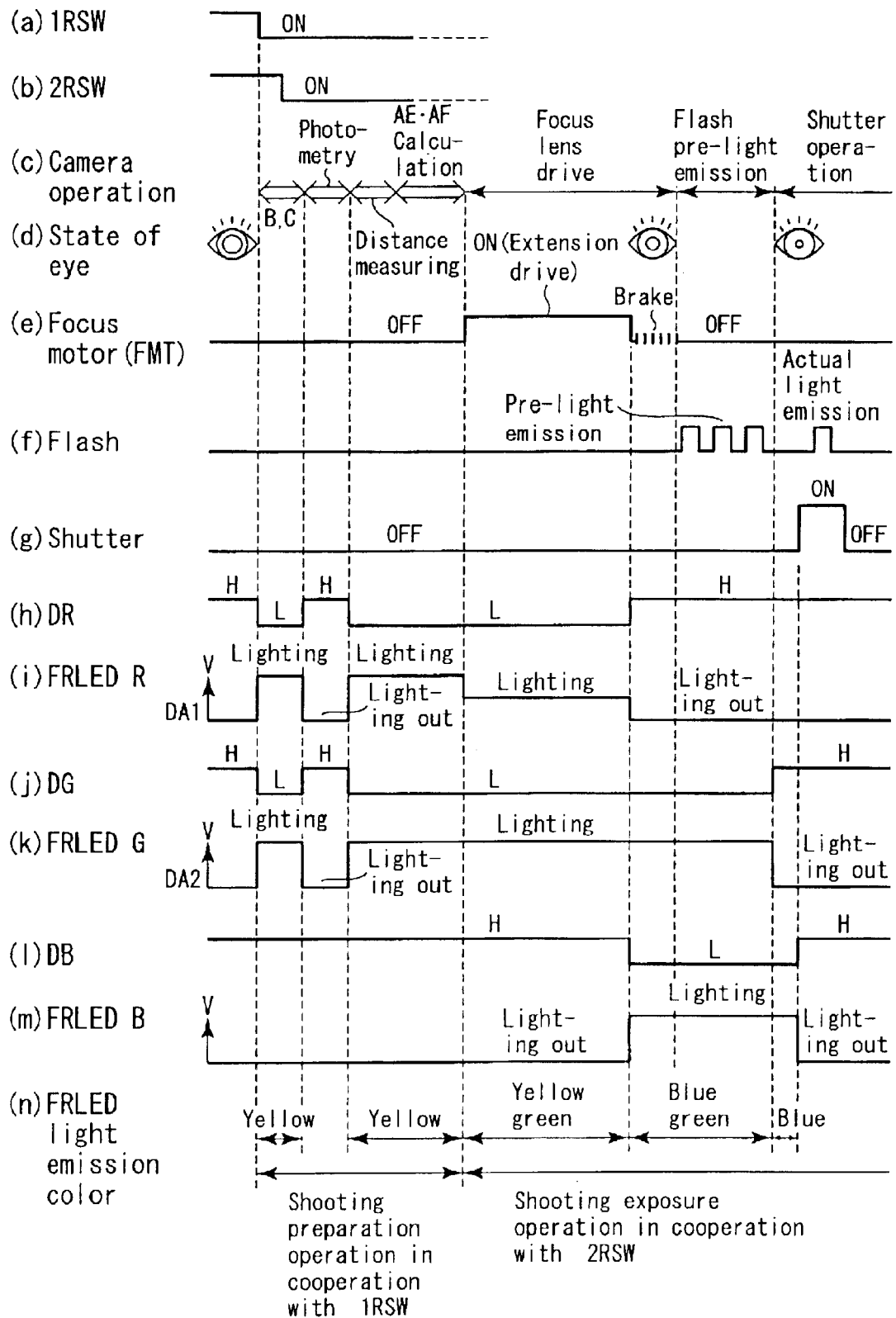
FIG. 15 is a timing chart for illustrating an embodiment of subjecting the FRLED to light emission control in cooperation with an operation of a release button.

When the 1RSW and the 2RSW are turned on with the timings indicated by a waveform (a) and a waveform (b) shown in FIG. 15, the on information of these switches is inputted to the CPU 303. When the on operation information of the 1RSW is inputted to the CPU 303, the CPU 303 performs the battery check (indicated by B. C in the drawing) operation to check a residual quantity of the battery 301 as indicated by the camera operation (c). If the residual quantity of the battery 301 is insufficient as a result of the battery check, the CPU 303 causes the LCD display unit 103 to display information that the battery is running down. Then, a camera operator is urged to replace the battery 301 by this information.

If a residual quantity of the battery 301 is sufficient as a result of the battery check, the CPU 303 drives the AE sensor 315 and performs the photometric operation to measure the brightness of an object. Upon completion of the photometric operation, the CPU 303 drives the AF sensor 314 and carries out the distance measuring operation to measure a distance to an object. Upon completion of the distance measuring operation, the CPU 303 calculates a quantity of drive used for focusing of the taking lens, an aperture value, an exposure value of opening/closing seconds of the shutter mechanism and others based on a photometric value obtained by the photometric operation and a distance value acquired by the distance measuring operation. This operation is a shooting preparation operation carried out in cooperation with turning on of the 1RSW.

After end of the AE and AF calculation, when the on operation information of the 2RSW is inputted to the CPU 303, the CPU 303 drives the FMT 312 by controlling the motor DR 308 based on a quantity of focusing drive of the taking lens obtained by the AE and AF calculation as indicated by a waveform (e). When the FMT 312 is driven, focusing (focus lens drive) of the taking les is performed. Upon completion of the focus lens drive, the CPU 303 controls the flash light emission circuit 307 as indicated by a waveform (f) and effects pre-light emission of the flash from the xenon tube 306. At this moment, the pupils of the eyes of a person as an object are contracted. Thereafter, the CPU 303 drives the SPL 311 by controlling the motor DR 308 as indicated by a waveform (g). As a result, the shutter is driven to be opened/closed. At this moment, the CPU 303 causes the xenon tube 306 to perform actual light emission by controlling the flash light emission circuit 307. That is, there is carried out the taking operation such as an operation to cause an object image to be exposed on a film in cooperation with turning on of the 2RSW.

That is, when the release button 106 is completely pressed, the 2RSW has been already in the on state while the shooting preparation operation performed in cooperation with the 1RSW is being effected. Therefore, upon completion of the shooting preparation operation, the shooting exposure operation is subsequently executed.

It is to be noted that pre-light emission to cause the flash to emit the light with a small quantity of light for a few times is performed if the pre-light emission mode is selected, and the shutter drive and the actual light emission of the flash are effected thereafter. If the pre-light emission mode is not selected, the pre-light emission is not performed, and hence the shutter drive and the actual light emission of the flash are executed. In addition, when the flash light emission is not necessary because the object is bright, or when the flash light emission is performed but the red-eye reduction is not necessary since the backlight correction is conducted, the pre-light emission of the flash is not carried out.

When the 1RSW is turned on, the CPU 303 controls the red chip 202, the green chip 203 and the blue chip 204 of the FRLED 201 by controlling the LED drive circuit 304 as indicated by a waveform (h), a waveform (j) and a waveform (l). That is, in the shooting preparation operation, the CPU 303 fully lights up the red chip 202 and the green chip 203 as indicated by a waveform (i) and a waveform (k), and puts off the blue chip 204 as indicated by a waveform (m). At this moment, since the light emission colors of the red chip 202 and the green chip 203 are combined, the FRLED 201 emits the light in substantially yellow. In photometry, however, since the light emission from the FRLED 201 may possibly generate an error in a photometric value, the CPU 303 puts off the FRLED 201.

Then, in the shooting operation carried out in cooperation with the 2RSW, when the focus motor (FMT) 312 is driven, the CPU 303 reduces the drive current of the red chip 202 as indicated by the waveform (i). At this moment, the FRLED 201 emits the light in a substantially yellow green color which is a combined color of the red color whose quantity of light is lowered by reduction in drive current of the red chip 202 and the green color obtained by full light emission of the green chip 203.

That is, in the shooting preparation operation, the CPU 303 causes the FRLED 201 to emit the light in yellow. Then, upon completion of the shooting preparation operation, in the shooting operation carried out in cooperation with the 2RSW, when the FMT 312 starts to be driven, the CPU 303 reduces a quantity of lighting of the red chip 202 of the FRLED 201 by half and causes the FRLED 201 to emit the light having the substantially yellow green color toward an object. As a result, as indicated by a pattern (d), the pupils of the eyes before starting the shooting preparation operation are gradually contracted in accordance with the light in yellow to yellow green emitted by the FRLED 201.

Upon completion of focusing of the taking lens performed by the FMT 312, the brake operation to stop the FMT 312 is effected. In this brake operation, the CPU 303 puts off the red chip 202, and drives the blue chip 204 to be lighted up. At this moment, the FRLED 201 emits the light in the substantially blue green color which is a combined color of the blue chip 204 and the green chip 203. When drive of the FMT 312 is stopped, the CPU 303 causes the xenon tube 306 to perform the pre-light emission operation by driving the flash light emission circuit 307. In this pre-light emission, the blue green light emission by the green chip 203 and the blue chip 204 of the FRLED 201 is continued. Then, upon completion of the pre-light emission, the CPU 303 starts the shutter drive by controlling the motor DR 308 and driving the SPL 311. Immediately before the CPU 303 starts drive of the shutter (not shown), the CPU 303 puts off the green chip 203 and causes only the blue chip 204 to emit the light. Then, concurrently with start of drive of the shutter, the CPU 303 puts off the blue chip 204.

That is, when the pupils of a person as an object are wide open in a dark place, in the shooting preparation operation, the CPU 303 contracts the pupils of the person to a certain degree by lighting up the FRLED 201. When the flash pre-light emission in the shooting operation is performed, the pupils are further contracted by this pre-light emission. Thereafter, since the actual light emission of the flash light is conducted in synchronization with drive of the shutter, the red-eye phenomenon can be prevented at the time of shooting exposure using the flash light emission.

Additionally, since the light emission color of the FRLED 201 gradually changes from the yellow color to the yellow green color and then from the yellow green color to the blue green color, a person as an object can recognize the timing of the pre-light emission or the timing of the actual light emission. That is, since the CPU 303 changes the light emission wavelength and the pattern of the FRLED 201 in accordance with respective operation states of the camera, a person as an object can readily grasp the operation state of the camera.

Figure 16:
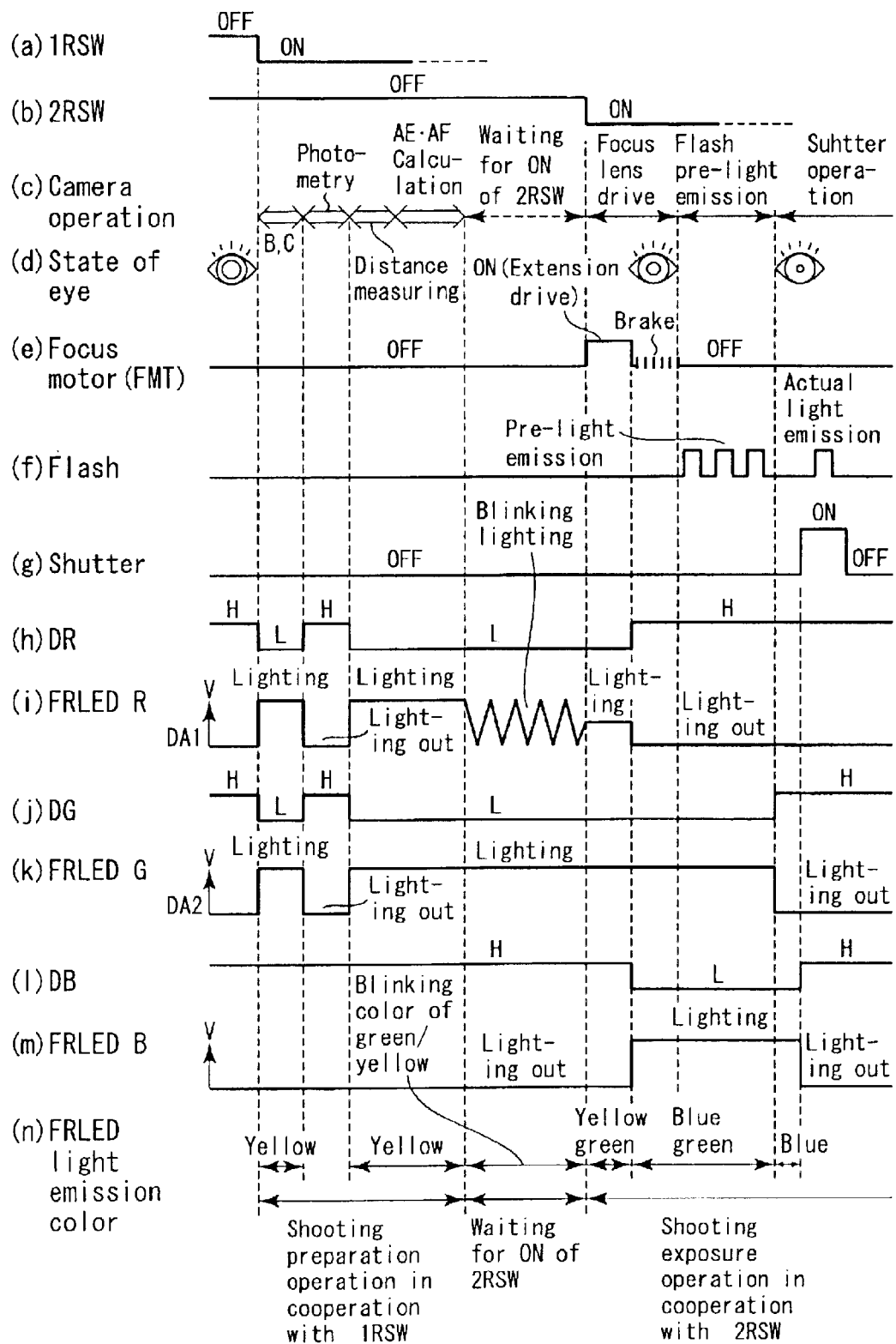
FIG. 16 is a timing chart for illustrating another embodiment of subjecting the FRLED to light emission control in cooperation with the operation of the release button.

Description will now be given as to the operation when turning on the 1RSW by pressing the release button 106 halfway and then turning on the 2RSW by fully pressing the release button 106 after a bit with reference to FIG. 16 as another embodiment of the present invention.

When the 1RSW is turned on, the CPU 303 performs the battery check (indicated by B. C in the drawing), the photometric operation and the distance measuring operation as the shooting preparation operations like the camera operation (c) shown in FIG. 16. Then, based on the photometric and distance data, the AE and AF calculation which is the calculation of data required for the shutter control and the focus control is carried out. After this calculation, since the 2RSW is yet to be turned on, the CPU 303 maintains this state for a while and stands by. Then, when the 2RSW is turned on, the CPU 303 starts the shooting operation.

In the shooting operation, the CPU 303 drives the FMT 312 by controlling the motor DR 308 based on the distance data obtained by the AE and AF calculation. Then, the FMT 312 drives a part or all of the lenses constituting the taking lens in such a manner the taking lens can enter the focused state as indicated by a waveform (e). Upon completion of this lens drive, the CPU 303 applies the brake on and stops the FMT 312. Thereafter, if the pre-light emission mode of the flash is selected, the pre-light emission to cause the flash to emit the light with a small quantity of light for a few times is conducted. Then, after this operation, the CPU 303 performs the shutter drive by controlling the motor DR 308 and driving the SPL 311 as indicated by the waveform (f) and the waveform (g), and effects the actual light emission of the flash at the same time. It is to be noted that the pre-light emission is not performed if the pre-light emission mode of the flash is not selected, but the shutter drive and the actual light emission of the flash are performed. Further, when the flash light emission is not necessary because an object is bright, or when the flash is caused to emit the light but the red-eye reduction is not necessary because the backlight correction is carried out, the pre-light emission of the flash is not performed.

In the shooting preparation operation which is started when the 1RSW is turned on, the CPU 303 controls the LED drive circuit 304, and generates and supplies such drive control signals as indicated by a waveform (h), a waveform (j) and a waveform (l) used to drive and control the red chip 202, the green chip 203 and the blue chip 204 of the FRLED 201. Then, based on the drive control signals, the LED drive circuit 304 turns on each of the red chip 202, the green chip 203 and the blue chip 204 as indicated by the waveform (i), a waveform (k) and a waveform (m). That is, in the shooting preparation operation, the red chip 202 and the green chip 203 are driven to be fully lighted up, and the blue chip 204 is put off. At this moment, since the light emission colors of the red chip 202 and the green chip 203 are combined, the FRLED 201 emits the light in substantially yellow. In photometry, however, since the light emission from the FRLED 201 may possibly generate an error in a photometric value, the CPU 303 puts off the FRLED 201.

Upon completion of this shooting preparation operation, the camera waits for the on operation of the 2RSW, but the CPU 303 periodically changes a drive current of the red chip 202 between a maximum value and a minimum value through the LED drive circuit 304 as indicated by the waveform (i) while waiting for the on operation of the 2RSW. As a result, the red chip 202 is caused to blink, and the FRLED 201 periodically blinks between the green color and the yellow color obtained by combination of the green color emitted from the green chip 203 and the red color emitted from the red chip 202. It is to be noted that this blinking and lighting operation control of the red chip 202 may be executed by periodically changing the drive control signal DR of the red chip 202 between High (H) and Low (L).

Then, when the 2RSW is turned on and the shooting exposure operation is started, the FMT 312 is driven. At this moment, the CPU 303 controls the drive current of the red chip 202 to the low level through the LED drive circuit 304. At this moment, the FRLED 201 emits the light in the yellow green color obtained by combination of the red color of the red chip 202 on the low light emission level and the green color fully emitted from the green chip 203. After performing the focusing adjustment of the taking lens by the FMT 312, the CPU 303 applies the brake on the FMT 312. At this moment, the CPU 303 controls to put off the red chip 202 and also controls to light up the blue chip 204. At this moment, the FRLED 201 emits the light in the blue green color which is a combined color of the green color emitted from the green chip 203 and the blue color emitted from the blue chip 204. Thereafter, when the FMT 312 is driven to stop, the CPU 303 causes the xenon tube 306 to perform the pre-light emission operation by driving and controlling the flash light emission circuit 307. In this pre-light emission, the CPU 303 continues the light emission in the blue green color by the green chip 203 and the blue chip 204 included in the FRLED 201. Then, after completion of the pre-light emission and immediately before start of the shutter operation, the CPU 303 controls to put off the green chip 203, and lights up only the blue chip 204. Thereafter, concurrently with start of drive of the shutter, the CPU 303 likewise puts off the blue chip 204.

That is, since the pupils of a person as an object are wide open in a dark place, the pupils can be contracted to some degree by lighting the RFLED 201 by the CPU 303 before the pre-light emission of the flash. When the pre-light emission is carried out, the pupils are further contracted. Thereafter, since the actual light emission of the flash light is performed in synchronization with drive of the shutter, the red-eye phenomenon due to the flash light emission can be avoided at the time of shooting exposure.

Further, since the light emission color of the FRLED 201 varies from the yellow color to the yellow green color and then from the yellow green color to the blue green color, a person as an object can recognize the timing of the pre-light emission or the timing of the actual light emission. That is, since the CPU 303 changes the light emission wavelength and the pattern of the FRLED 201 in accordance with the various operation states of the camera, the person as an object can readily grasp the operating state of the camera.

Furthermore, yet another embodiment according to the present invention will now be described. In this embodiment, after the 1RSW of the release button is turned on, the lighting control of the FRLED 201 is performed in accordance with elapse of the time.

Figure 17:
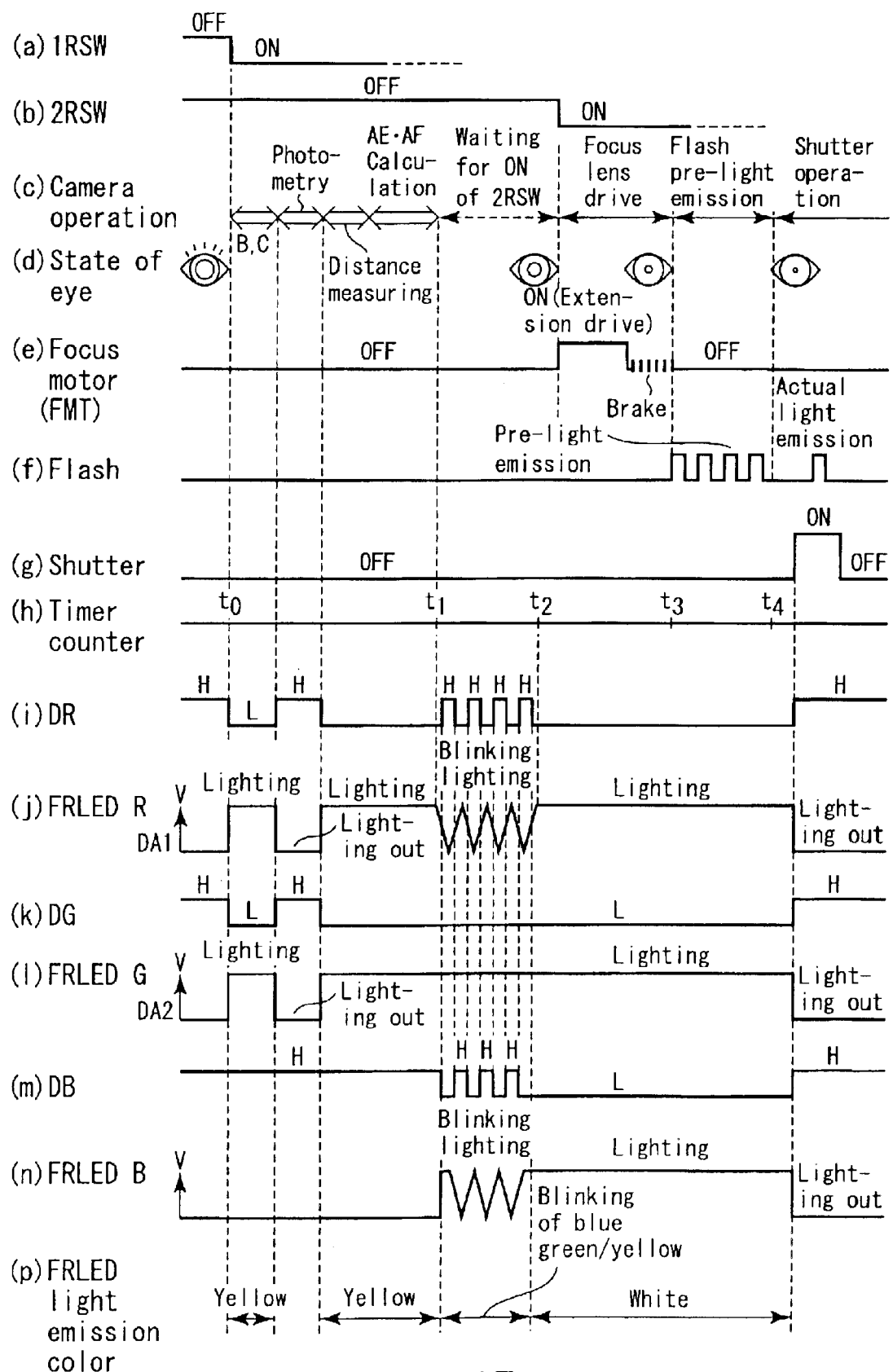

When the release button 106 is pressed halfway and the 1RSW is turned on, the CPU 303 starts counting of a timer contained in the CPU 303 in accordance with a waveform (h) illustrated in FIG. 17. The shooting preparation operations such as the battery check (B. C), photometry, distance measuring and AE/AF calculation are performed every predetermined time after start of this timer counting. It is to be noted that a shooting preparation operation time t1, a time t2 when a predetermined time has elapsed after the shooting preparation operation time t1, a time t3 after elapse of a predetermined time used to cause the taking lens to perform the focus lens drive from the time t2, and a time t4 after elapse of the time required to perform the flash pre-light emission from the time t3 are set in this timer counting.

That is, when various control signals are generated and supplied from the CPU 303 in accordance with elapse of the times t1 to t4 set in the CPU 303, the shooting preparation operation and the shooting operation are executed. Furthermore, in accordance with these operations, the CPU 303 displays the state of the camera and avoids the red eye by driving and controlling the FRLED 201.

In the concrete drive control of the FRLED 201, when the 1RSW is turned on, the CPU 303 starts timer counting. Simultaneously, the CPU 303 generates and supplies drive control signals indicated by waveforms (i), (k) and (m) to the LED drive circuit 304. In accordance with these control signals, the LED drive circuit 304 controls to light up each of the red chip 202, the green chip 203 and the blue chip 204 as indicated by the waveforms (j), (l) and (n). That is, in the shooting preparation operation, the CPU 303 drives to fully light up the red chip 202 and the green chip 203, and puts off the blue chip 204. As a result, the FRLED 201 emits the light in the substantially yellow color which is a combined color of the red color of the red chip 202 and the green color of the green chip 203. However, in photometry, the light emitted from the FRLED 201 may possibly generate an error in the photometric value, and hence the CPU 303 stops emission of the light by the FRLED 201.

When the time t1 indicative of the end of the shooting preparation operation is counted, the CPU 303 waits for the 2RSW to be turned on. In the period from the time t1 to the time t2 which is the state of waiting for the 2RSW to be turned on, the CPU 303 controls the LED drive circuit 304 and periodically changes the drive current of the red chip 202 between a maximum value and a minimum value as indicated by waveforms (i) and (j). Further, the CPU 303 controls the LED drive circuit 304 and periodically changes the drive current of the blue chip 204 between a maximum value and a minimum value as indicated by waveforms (m) and (n).

It is to be noted that the CPU 303 controls so as to put off the blue chip 204 when the red chip 202 is turned on, and controls so as to light up the blue chip 204 when the red chip 202 is put off.

By alternately lighting the red chip 202 and the blue chip 204, the FRLED 201 blinks while periodically changing its light emission color between the yellow color and the blue green color, which is obtained by combining the light emission color of the alternate lighting and the green color emitted from the green chip 203.

When the end time t2 indicative of the state that the periodic light emission color of the yellow color and the blue green color varies and blinks is reached, the CPU 303 controls so as to fully light up the red chip 202, the green chip 203 and the blue chip 204. As a result, the FRLED 201 emits the light in the substantially white color by combination of the red color, the green color and the blue colors emitted from the respective chips.

After shifting from blinking of the light emission color to the light emission of the white color in the period of the time t1 to the time t2, when the 2RSW is turned on and the shooting operation is started, the CPU 303 drives the FMT 312 and executes the focusing adjustment of the taking lens and the pre-light emission of the flash.

Upon completion of the pre-light emission, the CPU 303 controls to put off the FRLED 201 concurrently with start of drive of the shutter.

That is, the pupils of a person as an object are contracted by the yellow color emitted from the FRLED 201 in the period from turning on of the 1RSW to the time t1 and blinking light emission of the yellow color and the blue green color emitted in the period from the time t1 to the time t2. Thereafter, the pupils are further contracted by the white light after the time t2. With the pupils being contracted by the white light, when the 2RSW is turned on and the pre-light emission of the flash is performed, the pupils are further contracted. Then, at the time of actual light emission of the flash in the shutter operation, the pupils of the person enters the contracted state in which the red-eye phenomenon does not occur.

Furthermore, the person as an object can recognize the timing of the pre-light emission or the timing of the actual light emission by a change in light emission color of the FRLED 201.

Although the present invention has been described based on the foregoing embodiments, the present invention is not restricted thereto, and it is needless to say that various modifications or applications can be carried out within the scope of the invention.

For example, although the camera using a regular film has been described in this invention, it may be an electronic camera which electrically stores an image. Moreover, as the front display LED (FRLED), one having three chips as one package has been described, but the number of the enclosed chips may be larger than three, and colors of the chips may be differently combined.

In addition, the chips enclosed in a plurality of different packages may be arranged in close proximity to each other. Additionally, the similar advantages can be realized with a fixed current without controlling the drive current.

Further, the relationship between lighting of the FRLED when the lens barrier is opened, a color and a pattern of lighting of the FRLED in zooming, and movement of the lens barrel may be different. Furthermore, as to light emission of the FRLED, the FRLED may be lighted based on information of, e.g., a photometric function of the camera only when the brightness is not more than a predetermined value. Alternatively, it can be considered that the light emission brightness or the light emission wavelength distribution may be changed based on this brightness.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera comprising:
    a light-emission portion that emits light in different colors such that the emitted light is visible from a side of the camera on which an object to be photographed is located;
    a lens barrel movable in a direction of an optical axis of the camera between a non-picture-taking position at which pictures cannot be taken and a picture-taking position at which pictures can be taken; and
    a light-emission control portion which controls the light-emission portion to sequentially change a color of the light emitted by the light-emission portion during an operation for moving the lens barrel from the non-picture-taking position to the picture-taking position.

2. The camera according to claim 1, further comprising a power switch for turning on the camera, wherein the lens barrel is moved from the non-picture-taking position to the picture-taking position after the power switch is turned on and while the lens barrel is shifted to a setup completion state from a collapsed state.

3. The camera according to claim 1, wherein the light-emission control portion controls the light-emission portion to: (i) emit light in a first color when the lens barrel is at a position near the non-picture-taking position, (ii) emit light in a second color when the lens barrel is at an intermediate position between the non-picture-taking position and the picture-taking position, and (iii) emit light in a third color when the lens barrel is near the picture-taking position.

4. The camera according to claim 3, wherein the light-emission portion controls the light-emission portion to gradually change the color of the light emitted by the light-emission portion as the color of light emitted by the light-emission portion is changed from the first color to the third color.

5. The camera according to claim 1, further comprising a focal length changing member for changing a focal length of a lens provided inside the lens barrel by further moving the lens barrel in the direction of the optical axis to another picture-taking position, wherein the light-emission control portion controls the light-emission portion to start emitting light in response to a start of an operation for changing the focal length of the lens by the focal length changing member.

6. The camera according to claim 1, wherein the light-emission portion comprises a light-emitting device comprising a chip that emits red light, a chip that emits green light, and a chip that emits blue light, and wherein the chips are formed into a package.

7. The camera according to claim 1, wherein the light-emission portion comprises a light-emitting device comprising a chip that emits light in a first color and a chip that emits light in a second color, and wherein the chips are formed into a package.

8. The camera according to claim 1, wherein the light-emission portion comprises a light-emitting device in which a chip that emits light in a first color is packaged, and a light-emitting device in which a chip that emits light in a second color is packaged.

9. A camera comprising:
light-emission means for emitting light in different colors such that the emitted light is visible from a side of the camera on which an object to be photographed is located;
a lens barrel movable in a direction of an optical axis of the camera between a non-picture-taking position at which pictures cannot be taken and a picture-taking position at which pictures can be taken; and
light-emission control means for controlling the light-emission portion to sequentially change a color of the light emitted by the light-emission portion during an operation for moving the lens barrel from the non-picture-taking position to the picture-taking position.

10. A camera comprising:
a light-emission portion that emits light in different colors such that the emitted light is visible from a side of the camera on which an object to be photographed is located;
a lens barrel movable in a direction of an optical axis between a non-picture-taking position at which pictures cannot be taken and a picture-taking position at which pictures can be taken;
a self-timer switch for placing the camera into a self-timer mode, in which a start time of a shutter operation is controlled; and
a light-emission control portion that: (i) controls the light-emission portion to emit Light in a first light-emission pattern by sequentially changing a color of the light emitted by the light-emission portion according to movement of the lens barrel when the lens barrel is moved from the non-picture-taking position to the picture-taking position, and (ii) controls the light-emission portion to emit light in a second light-emission pattern by sequentially changing the color of the light emitted by the light-emission portion according to a clock time when a clock display is made in the self-timer mode.

11. A camera comprising:
a light-emission portion that emits light in different colors such that the emitted light is visible from a side of the camera on which an object to be photographed is located;
a camera operation control portion that causes predetermined camera operation control to start in response to switching of a power switch from off to on; and
a light-emission control portion that controls the light-emission portion to change a color of the light emitted by the light-emission portion according to operations carried out under the camera operation control by the camera operation control portion.

12. The camera according to claim 11, further comprising a self-timer switch for placing the camera into a self-timer mode, in which a start time of a shutter operation is controlled, wherein the light-emission control portion controls the light-emission portion to emit light in a predetermined light-emission pattern by sequentially changing the color of the light emitted by the light-emission portion according to a clock time when a clock display is made in the self-timer mode.

13. A camera comprising:
light-emission means for emitting light in different colors such that the emitted light is visible from a side of the camera on which an object to be photographed is located;
camera operation control means for causing predetermined camera operation control to start in response to switching of a power switch from off to on; and
light-emission control means for controlling the light-emitting means to change a color of the light emitted by the light-emitting means according to operations carried out under the camera operation control by the camera operation control means.

14. A camera comprising:
a light-emission portion that emits light in different colors such that the emitted light is visible from a side of the camera on which an object to be photographed is located;
a lens barrel movable in a direction of an optical axis; and
a light-emission control portion that: (i) controls the light-emission portion to emit light in a light-emission pattern including emitting light in at least a first color while the lens barrel is being moved, and (ii) controls the light-emission portion to emit light in a light-emission pattern including emitting light in at least a second color different from the first color when movement of the lens barrel is substantially completed or completed.

15. A camera part inspection apparatus comprising:
a connector mountable on a camera main body, wherein an electric board is removably electrically connected to the connector, and wherein mounted on the electric board are: (i) a light-emission portion capable of emitting light in different colors such that the emitted light is visible from a side of a camera on which an object to be photographed is located, and (ii) an electric part required for camera operation; and
an inspection control portion that controls the light-emission portion to indicate an inspection result by a color of the light emitted by the light-emission portion when the electric part is inspected.

16. The camera part inspection apparatus according to claim 15, wherein the inspection control portion controls the light-emission portion to change light-emission patterns according to an inspection result.

17. A camera adjustment apparatus comprising:
a mounting portion on which a camera is removably mounted;
an adjustment portion that adjusts the camera mounted on the mounting portion; and
a light-emission control portion that controls light emission by a light-emission portion for displaying a camera operation state, wherein the light-emission portion is provided on the camera and emits light in different colors, and wherein the light-emission control portion controls the light-emission portion to emit light in different colors according to an adjustment state output from the adjustment portion such that the light-emission portion displays adjustment results.

18. The camera adjustment apparatus according to claim 7, wherein the light-emission control portion controls the light-emission portion to change light-emission patterns according to the adjustment state output from the adjustment portion.

19. An adjustment apparatus, having a mounting portion on which a camera part unit is removably mounted, for adjusting the camera part unit when the camera part unit is mounted on the mounting portion, said adjustment apparatus comprising:
an optical axis adjustment portion that adjusts a position of an optical axis of a measurement portion and a position of an optical axis of a finder portion by displacing one of the measurement portion and the finder portion so that the optical axis of the measurement portion and the optical axis of the finder portion satisfy a predetermined positional relationship, when the measurement portion and the finder portion are provided as a unit and the unit is to be adjusted;
a detection portion that detects a state of displacement between the position of the optical axis of the measurement portion and the position of the optical axis of the finder portion; and
a light-emission control portion that controls a light-emission portion for a camera operation state display, wherein the light-emission portion is incorporated in the unit and emits light in different colors, and wherein the light-emission control portion controls the light-emission portion to emit light in different colors according to a displacement state detected by the detection portion so that the light-emission portion displays an adjustment state.

20. An adjustment apparatus according to claim 19, wherein the light-emission control portion controls the light-emission portion to change light-emission patterns according to the adjustment state of the optical axis adjustment portion.

21. A camera part unit comprising:
a light-emission portion winch is mountable on a camera main body, and which emits light in different colors such that the emitted light is visible from a side of a camera on which an object to be photographed is located;
an electric part required for camera operation; and
an electric board on which the light-emission portion and the electric part are mounted, and which includes a connection portion that is removably connectable to a connector of an inspection apparatus,
wherein the inspection apparatus includes an inspection portion for inspecting a circuit of the electric board, and a light-emission control portion that controls light emission by the light-emission portion, wherein the light-emission control portion controls the light-emission portion to change a color of the light emitted by the light-emission portion according to a result of inspection of the electric circuit by the inspection apparatus so as to display the result of the inspection by the inspection apparatus.

22. The camera part unit according to claim 21, wherein the light-emission control portion controls the light-emission portion to change light-emission patterns according to the result of the inspection of the electric circuit by the inspection apparatus.

* * * * *